United States Patent
Boyes et al.

(10) Patent No.: US 10,060,502 B2
(45) Date of Patent: Aug. 28, 2018

(54) ISOLATOR FOR USE WITH ENGINE THAT IS ASSISTED OR STARTED BY AN MGU OR A MOTOR THROUGH AN ENDLESS DRIVE MEMBER

(71) Applicant: LITENS AUTOMOTIVE PARTNERSHIP, Woodbridge (CA)

(72) Inventors: Andrew M. Boyes, Aurora (CA); Warren J. Williams, Oakville (CA); Gary J. Spicer, Mississauga (CA)

(73) Assignee: Litens Automotive Partnership, Woodbridge (CA)

( * ) Notice: Subject to any disclaimer, the term of this patent is extended or adjusted under 35 U.S.C. 154(b) by 518 days.

(21) Appl. No.: 14/434,359

(22) PCT Filed: Oct. 15, 2013

(86) PCT No.: PCT/CA2013/000881
§ 371 (c)(1),
(2) Date: Apr. 8, 2015

(87) PCT Pub. No.: WO2014/056097
PCT Pub. Date: Apr. 17, 2014

(65) Prior Publication Data
US 2015/0260233 A1 Sep. 17, 2015

Related U.S. Application Data

(60) Provisional application No. 61/712,805, filed on Oct. 12, 2012, provisional application No. 61/713,463, (Continued)

(51) Int. Cl.
*F16F 15/123* (2006.01)
*F16H 55/36* (2006.01)

(52) U.S. Cl.
CPC ....... *F16F 15/12333* (2013.01); *F16H 55/36* (2013.01); *F16H 2055/366* (2013.01)

(58) Field of Classification Search
CPC ..... F02N 15/02; F16F 15/121; F16F 15/1216; F16F 15/123; F16F 15/12306;
(Continued)

(56) References Cited

U.S. PATENT DOCUMENTS

| 3,556,273 A | 1/1971 | Maucher |
| 3,666,021 A | 5/1972 | Whitehouse |

(Continued)

FOREIGN PATENT DOCUMENTS

| CA | 2753767 A1 | 10/2009 |
| CA | 2802116 A1 | 12/2011 |

(Continued)

OTHER PUBLICATIONS

Extend European search report for EP3025072 dated Feb. 17, 2017.
(Continued)

*Primary Examiner* — Josh Skroupa
(74) *Attorney, Agent, or Firm* — Millman IP Inc.

(57) ABSTRACT

An isolator includes a driver that is connectable with a shaft of a device, a rotary drive member that is engageable with an endless drive member; and a first isolation spring and a second isolation spring. The first and second isolation springs are positioned such that during rotation of the driver in a first direction torque is transferred from the driver to the first rotary drive member through the first isolation spring and not through the second isolation spring, and such that during rotation of the first rotary drive member in the first direction torque is transferred from the first rotary drive member to the driver through the second isolation spring and not through the first isolation spring.

9 Claims, 24 Drawing Sheets

Related U.S. Application Data filed on Oct. 12, 2012, provisional application No. 61/759,396, filed on Jan. 31, 2013.

(58) Field of Classification Search
CPC .......... F16F 15/12333; F16F 15/12346; F16F 15/12353; F16H 2055/366
USPC ........................ 464/67.1, 68.1, 68.9, 68.92
See application file for complete search history.

(56) References Cited

U.S. PATENT DOCUMENTS

| | | |
|---|---|---|
| 4,092,837 A | 6/1978 | Gebauer et al. |
| 4,483,685 A | 11/1984 | Spasiano et al. |
| 4,591,868 A | 5/1986 | Cusey et al. |
| 4,690,256 A | 9/1987 | Bopp et al. |
| 5,048,657 A | 9/1991 | Dissett et al. |
| 5,380,248 A | 1/1995 | Kraus et al. |
| 5,487,704 A * | 1/1996 | Friedmann ............... F16D 13/70 464/24 |
| 5,711,407 A * | 1/1998 | Maier ................. F16F 15/1238 192/201 |
| 5,893,355 A | 4/1999 | Glover et al. |
| 5,964,674 A | 10/1999 | Serkh et al. |
| 6,044,943 A | 4/2000 | Bytzek et al. |
| 6,051,901 A * | 4/2000 | Ishida .................... H02K 7/003 292/301 |
| 6,083,130 A | 7/2000 | Mevissen et al. |
| 6,131,487 A | 10/2000 | Jackel et al. |
| 6,244,577 B1 | 6/2001 | Bucholtz |
| 6,712,706 B2 | 3/2004 | Jackel et al. |
| 7,153,227 B2 | 12/2006 | Dell et al. |
| 7,204,772 B2 | 4/2007 | Huber |
| 7,207,910 B2 | 4/2007 | Dell et al. |
| 7,217,204 B2 | 5/2007 | Roby |
| 7,510,062 B2 | 3/2009 | Derr |
| 7,624,852 B2 | 12/2009 | Mevissen et al. |
| 7,708,661 B2 | 5/2010 | Pflug et al. |
| 7,878,315 B2 | 2/2011 | Saito et al. |
| 7,891,475 B2 | 2/2011 | Zhu et al. |
| 7,892,124 B2 | 2/2011 | Hodjat et al. |
| 7,954,613 B2 | 6/2011 | Mevissen et al. |
| 8,021,253 B2 | 9/2011 | Dell et al. |
| 8,028,602 B2 | 10/2011 | Crist |
| 8,038,554 B2 | 10/2011 | Watanabe et al. |
| 8,192,312 B2 | 6/2012 | Ali et al. |
| 8,276,720 B2 | 10/2012 | Farahati et al. |
| 8,313,400 B2 | 10/2012 | Serkh et al. |
| 8,419,574 B2 | 4/2013 | Serkh et al. |
| 9,194,438 B2 | 11/2015 | Dell |
| 2002/0019263 A1 | 2/2002 | Jackel et al. |
| 2004/0014540 A1 | 1/2004 | Dell et al. |
| 2004/0226393 A1 | 11/2004 | Hong |
| 2006/0122014 A1 | 6/2006 | Kamdem |
| 2006/0172832 A1 | 8/2006 | Watanabe et al. |
| 2006/0264280 A1 | 11/2006 | Dell et al. |
| 2008/0139351 A1 | 6/2008 | Pflug et al. |
| 2008/0312014 A1 | 12/2008 | Stief et al. |
| 2009/0022377 A1 | 1/2009 | Matsue et al. |
| 2009/0107791 A1 | 4/2009 | Zhu et al. |
| 2009/0012140 A1 | 5/2009 | Lehmann et al. |
| 2009/0121401 A1 | 6/2009 | Lehmann et al. |
| 2009/0176583 A1 | 7/2009 | Dell et al. |
| 2009/0194380 A1 | 8/2009 | Ali et al. |
| 2009/0223775 A1 | 9/2009 | Hodjat et al. |
| 2010/0032258 A1 | 2/2010 | Mevissen et al. |
| 2010/0009952 A1 | 4/2010 | Rolando |
| 2010/0099527 A1 | 4/2010 | Rolando |
| 2010/0120563 A1 | 5/2010 | Serkh et al. |
| 2010/0167856 A1 | 7/2010 | Hartman et al. |
| 2011/0245000 A1 | 10/2011 | Serkh et al. |
| 2011/0256968 A1 | 10/2011 | Serkh et al. |
| 2011/0263365 A1 | 10/2011 | Mende et al. |
| 2011/0315502 A1 | 12/2011 | Antchak et al. |
| 2012/0015768 A1 | 1/2012 | Serkh et al. |
| 2012/0088616 A1 | 4/2012 | Ali et al. |
| 2012/0094791 A1 | 4/2012 | Lee |
| 2012/0149511 A1 | 6/2012 | Hodjat |
| 2013/0098733 A1 | 4/2013 | Antchak et al. |
| 2016/0123453 A1 | 5/2016 | Starodoubov et al. |

FOREIGN PATENT DOCUMENTS

| | | |
|---|---|---|
| CN | 101275612 A | 10/2008 |
| CN | 101915298 A | 12/2010 |
| CN | 102341610 A | 2/2012 |
| DE | DL 21202 | 4/1961 |
| DE | 4424988 C1 | 6/1995 |
| DE | 19730001 A1 | 1/1999 |
| DE | 19912970 A1 | 9/1999 |
| DE | 19919449 A1 | 11/1999 |
| DE | 102005016897 A1 | 10/2006 |
| DE | 102005062318 A1 | 7/2007 |
| DE | 102006039362 A1 | 3/2008 |
| DE | 102007058018 A1 | 7/2008 |
| DE | 102008059263 A1 | 6/2009 |
| DE | 102009039989 A1 | 4/2010 |
| DE | 102009052058 A1 | 6/2010 |
| DE | 102010023714 A1 | 1/2011 |
| EP | 0349267 A1 | 6/1989 |
| EP | 934843 A1 | 8/1999 |
| EP | 1645783 A1 | 4/2006 |
| EP | 1662161 A1 | 5/2006 |
| EP | 1710465 A1 | 11/2006 |
| EP | 1939494 A2 | 7/2008 |
| EP | 2148109 A1 | 1/2010 |
| EP | 2255100 A1 | 12/2010 |
| EP | 2273144 A1 | 1/2011 |
| EP | 2235400 A4 | 6/2011 |
| EP | 1621796 B1 | 10/2011 |
| EP | 2203655 B1 | 10/2012 |
| EP | 2556274 A1 | 2/2013 |
| EP | 2558749 A1 | 2/2013 |
| EP | 2010792 A4 | 7/2013 |
| EP | 2638304 A1 | 9/2013 |
| GB | 2308173 A | 6/1997 |
| KR | 1020110131197 A | 12/2011 |
| WO | 1991010075 A1 | 7/1991 |
| WO | 1996012122 A1 | 4/1996 |
| WO | 1998021062 A1 | 5/1998 |
| WO | 2003046407 A1 | 6/2003 |
| WO | 2005005865 A1 | 1/2005 |
| WO | 2005028899 A1 | 3/2005 |
| WO | 2007074016 A1 | 7/2007 |
| WO | 2007077414 A1 | 7/2007 |
| WO | 2007077415 A1 | 7/2007 |
| WO | 2007121582 A1 | 11/2007 |
| WO | 2008067915 A1 | 11/2007 |
| WO | 2008002845 A2 | 1/2008 |
| WO | 2008022897 A1 | 2/2008 |
| WO | 2008049388 A2 | 5/2008 |
| WO | 2008058499 A2 | 5/2008 |
| WO | 2008071306 A1 | 6/2008 |
| WO | 2009099504 A2 | 8/2009 |
| WO | 2009111036 A1 | 9/2009 |
| WO | 2011126916 A1 | 9/2009 |
| WO | 2010005880 A1 | 1/2010 |
| WO | 2010099605 A1 | 9/2010 |
| WO | 2011130106 A1 | 10/2011 |
| WO | 2011160215 A1 | 12/2011 |
| WO | 2012009314 A1 | 1/2012 |
| WO | 2012061930 A1 | 5/2012 |
| WO | 2012082479 A1 | 6/2012 |
| WO | 2013033825 A1 | 3/2013 |
| WO | 2013124009 A1 | 8/2013 |
| WO | 2014186876 A1 | 11/2014 |

OTHER PUBLICATIONS

Office Action for CN201380053505.8 dated Feb. 23, 2017.
Office Action for CN201380053505.8 dated Feb. 23, 2017, English translation.
English translation of Office Action for CN201380053505.8 dated Apr. 12, 2016.

(56) References Cited

OTHER PUBLICATIONS

International Search Report and Written Opinion for PCT/CA2014/000456 dated Sep. 3, 2014.
Office Action for CN201380053505.8 dated Apr. 12, 2016.
ISR & WO for PCT/CA2014/000592 dated Oct. 29, 2014.
Kibblewhite Precision Machining, Inc., "Installation Instructions for KPMI Part No. 90/9034", Feb. 26, 2010, Pacifica, CA, USA.
PCT/CA2013/000881, International Search Report, dated Jan. 28, 2014.
Extended European Search Report for EP103806 dated Jul. 7, 2017.
Extended European Search Report for EP14859575 dated Jun. 6, 2017.
Office Action for CN201480029125.5 dated Jul. 24, 2017.
Office Action for CN201480029125.5 dated Jul. 24, 2017—English Translation.
Office Action for CN201480041408.1 dated Aug. 21, 2017.
Office Action for CN201480041408.1 dated Aug. 21, 2017—English Translation.
Written Opinion for PCT/CA2013/000881, dated Jan. 28, 2014, ISA.
International Preliminary Report on Patentability for PCT/CA2013/000881, dated Apr. 15, 2015, ISA.
U.S. Appl. No. 14/470,937, Office Action, dated Jan. 29, 2016.
Office Action for CN2014800414382 dated Mar. 2, 2017.
Office Action for CN2014800414382 dated Mar. 2, 2017—English translation.
Reporting letter for Office Action for CN201480041438.2 dated Mar. 28, 2017.
Office Action for CN201480041408.1 dated Feb. 28, 2018.
Office Action of CN201480041408.1 dated Feb. 28, 2018—English translation of form.
Office Action for CN201480041408.1 dated Feb. 28, 2018—English translation.
Office Action for CN2014800615502 dated Dec. 5, 2017.
Office Action for CN2014800615502 dated Dec. 5, 2017—English translation.

\* cited by examiner

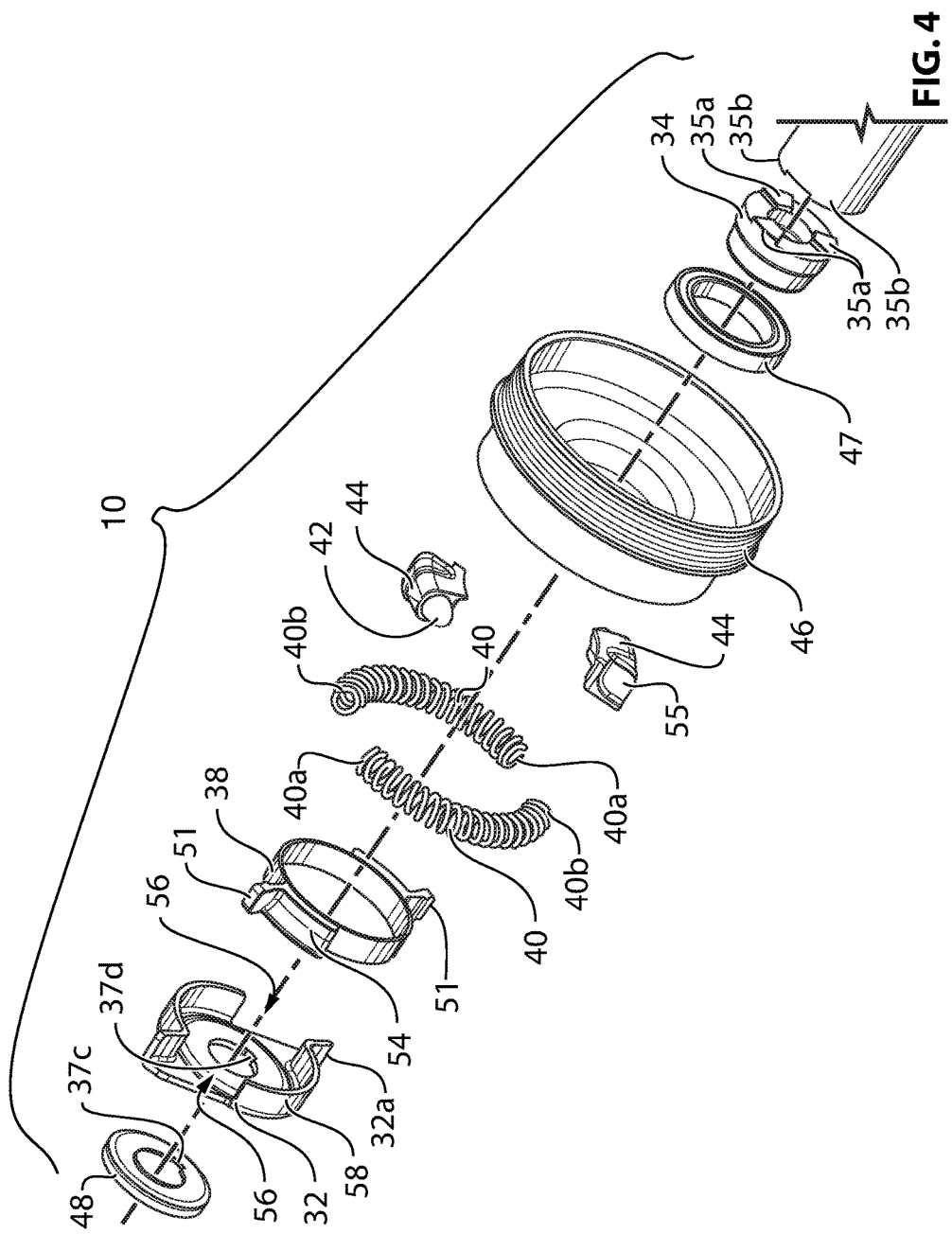

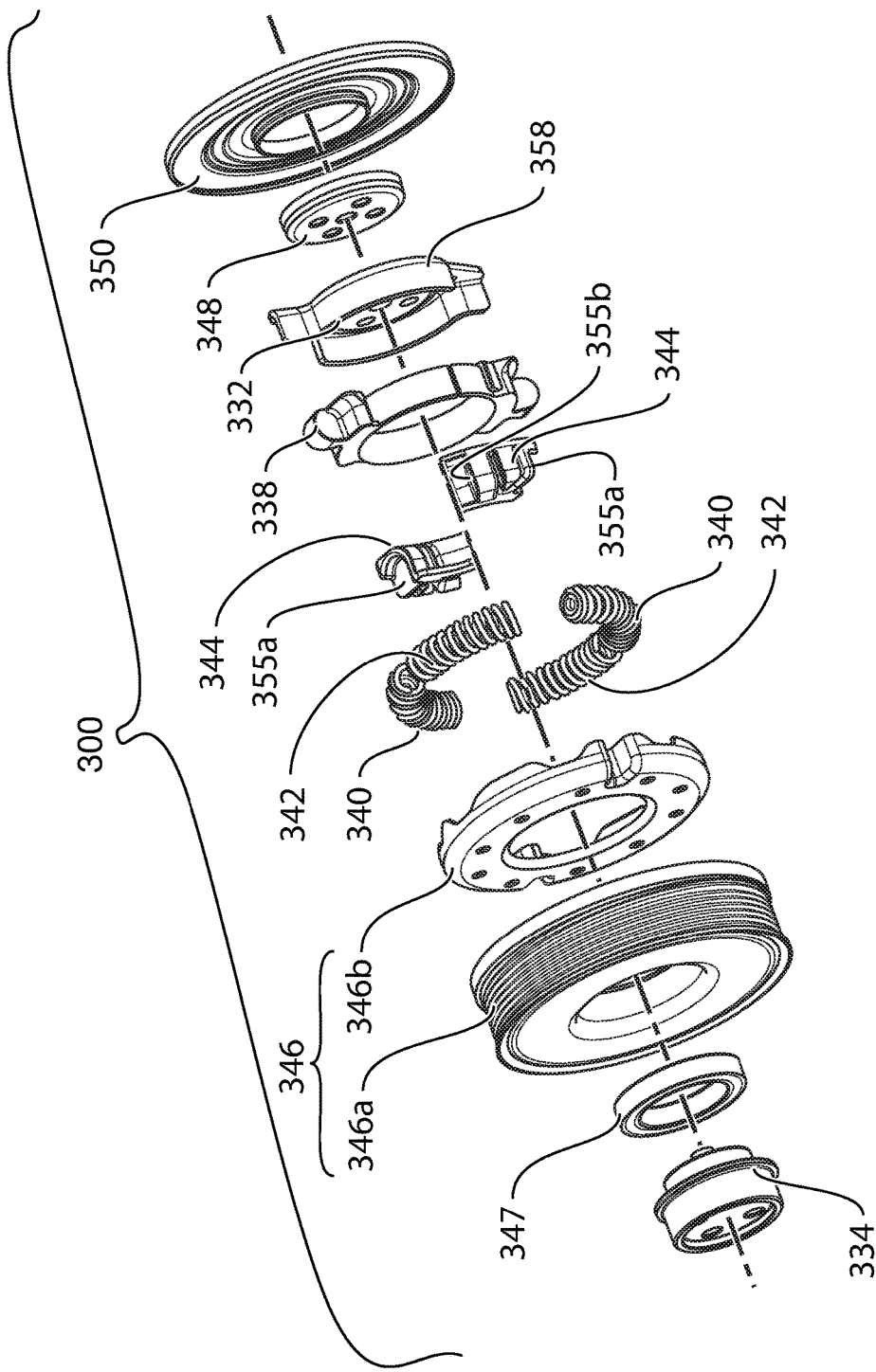

ISOLATOR FOR USE WITH ENGINE THAT IS ASSISTED OR STARTED BY AN MGU OR A MOTOR THROUGH AN ENDLESS DRIVE MEMBER

CROSS-REFERENCE TO RELATED APPLICATIONS

This application claims priority to U.S. Provisional Patent Application No. 61/712,805 filed Oct. 12, 2012, U.S. Provisional Patent Application No. 61/713,463 filed Oct. 12, 2012, and U.S. Provisional Patent Application No. 61/759,396 filed Jan. 31, 2013, the contents of all of which are incorporated herein in their entirety.

FIELD

This disclosure relates to isolators and in particular to isolators that are used on an engine crankshaft or on a motor-generator unit (MGU) shaft in vehicles in which the engine can be started or boosted by the MGU through a belt (e.g. an engine equipped with a belt-alternator start (BAS) drive system).

BACKGROUND

Isolators are known devices that are installed on engine crankshafts for reducing the transmission of torsional vibrations from the crankshaft to a belt driven by the crankshaft. While a traditional isolator is useful in many vehicular applications, some isolators do not perform ideally in applications wherein the belt is sometimes used to transmit torque to the crankshaft, for example as part of a Belt-Alternator Start (BAS) drive system wherein an electric motor is used to drive the belt in order to drive the crankshaft for the purpose of starting the engine.

It would be advantageous to provide an isolator that is configured for use in vehicles with BAS drive systems or the like.

SUMMARY

In an aspect the invention is directed to an isolator comprising a driver that is connectable with a shaft of a motive device, a first rotary drive member that is operatively engageable with at least one second rotary drive member, a first isolation spring and a second isolation spring. The motive device may be an engine (and thus the shaft may be a crankshaft), or a motor for assisting an engine, for example. Examples of motors for assisting engines include motor/generator units (MGU's) that can operate as a generator when driven to rotate mechanically, and can operate as a motor when driven to rotate electrically. The first isolation spring is positioned to transfer a torque from the driver to the rotary drive member and not from the rotary drive member to the driver during rotation of the driver in a first direction. The second isolation spring is positioned to transfer a torque from the rotary drive member to the driver during rotation of the rotary drive member in the first direction.

In another aspect the invention is directed to an isolator comprising a driver that is connectable with a shaft of a motive device, a first rotary drive member that is operatively engageable with at least one second rotary drive member, and a first isolation spring and a second isolation spring. The first and second isolation springs are positioned such that during rotation of the driver in a first direction torque is transferred from the driver to the rotary drive member through the first isolation spring and not through the second isolation spring, and such that during rotation of the rotary drive member in the first direction torque is transferred from the rotary drive member to the driver through the second isolation spring and not through the first isolation spring.

In yet another aspect the invention is directed to an isolator comprising a driver that is connectable with a shaft of a motive device, a first rotary drive member that is operatively engageable with at least one second rotary drive member and an isolation spring that is positioned to transfer a torque between the driver and the rotary drive member, wherein the isolation spring is made from a closed-cell foam. The closed-cell foam may be configured to provide a spring rate that varies non-linearly along the length of the isolation spring. For example, the closed cell foam may be configured to provide a spring rate that increases progressively and in a greater-than-linear manner.

In yet another aspect the invention is directed to an isolator that includes a driver that is connectable with a shaft of a motive device, a first rotary drive member that is operatively engageable with at least one second rotary drive member, at least one first isolation spring that is positioned to transfer a torque from the shaft connector to the rotary drive member, and at least one second isolation spring that is positioned to transfer a torque from the rotary drive member to the shaft connector. At least one radially outward projection from the driver has a first isolator spring drive surface on one side and a second isolator spring force receiving surface on the other side. At least one radially inward projection from the rotary drive member has a first isolator spring force receiving surface on one side and a second isolator spring drive surface on the other side.

BRIEF DESCRIPTION OF THE DRAWINGS

The foregoing and other aspects will now be described by way of example only with reference to the attached drawings, in which:

FIG. 4 is another exploded perspective view of the isolator shown in FIG. 1;

FIG. 13 is another perspective exploded view of the isolator shown in FIG. 10;

DETAILED DESCRIPTION OF EXAMPLE EMBODIMENTS

Figure 1:
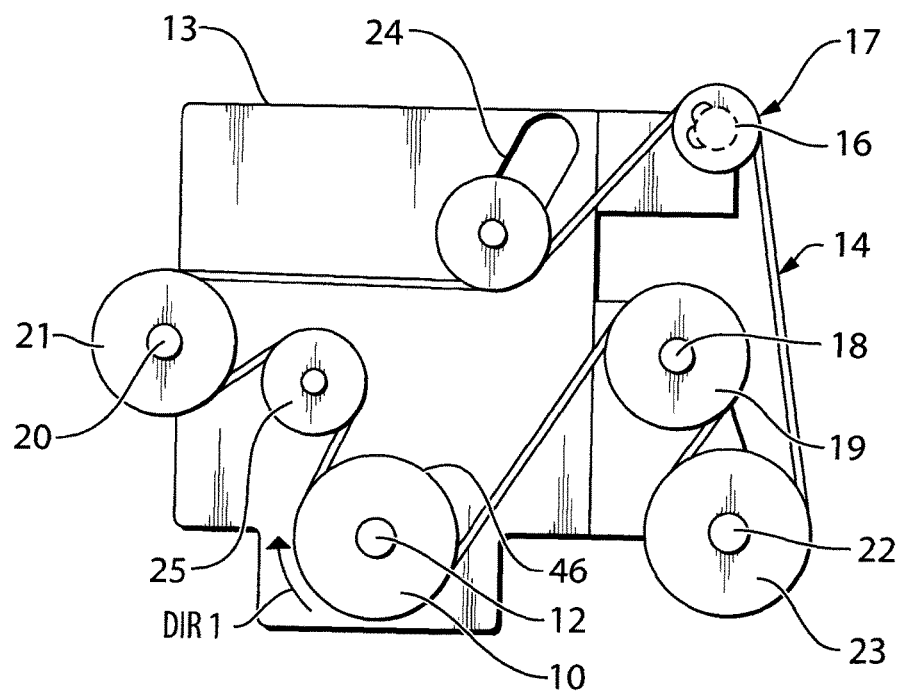
FIG. 1 is a side view of an engine in a vehicle containing an isolator on a crankshaft, in accordance with an embodiment of the present invention.

Reference is made to FIG. 1, which shows an embodiment of an isolator 10 positioned for use between a crankshaft 12 on a vehicle engine 13 and an accessory drive belt 14. The belt 14 may be used to transfer torque from the crankshaft 12 to drive accessories such as an alternator 16 via pulley 17, a power steering pump 18 via pulley 19, a water pump 20, via pulley 21, an air conditioning compressor 22 via pulley 23, and/or any other suitable accessories. A belt tensioner is shown at 24 for maintaining belt tension, and an idler are shown at 25 for maintaining a suitable amount of belt wrap on selected components. The terms 'pulley' and 'belt' are used for convenience, however it will be understood that the belt may be any suitable endless drive member and the pulleys may instead be any suitable rotary drive member that can transfer power to and from the endless drive member.

In some vehicles, such as some hybrid vehicles, the engine 13 may be stopped temporarily in some situations (such as when the vehicle is stopped at a stoplight) and may be started again through the accessory drive belt 14. In such situations, the alternator 16 may be an MGU that can be operated as a generator when the engine 13 is running so as to generate electricity for storage in a vehicle battery (not shown), and that can be operated as an electric motor to drive the crankshaft 12 via the belt 14, enabling the engine 13 to be started via the belt 14 (i.e. a BAS drive system). Instead of providing an MGU as the alternator 16, the alternator 16 may be a standard alternator, and a dedicated electric, hydraulic or pneumatic motor (not shown) could alternatively be provided for use in starting the engine 13. The MGU, or the dedicated other motor may be referred to generally as a supplemental motor, as it is a supplemental means for providing power to the crankshaft 12, as distinguished from the engine 13 itself which is the main means for providing power to the crankshaft 12. Instead of, or in addition to, being used to start the engine 13, the supplemental motor may be used to provide a power boost to the engine 13 via the belt 14. The isolator 10 is suited for use on any crankshaft and with any engine, but is particularly suited for use on engines that are configured to be started or boosted in power by an MGU or motor via a belt or other endless drive member, and engines that are configured to be started or boosted in power by an MGU or motor via a gear drive or other type of operative connection between a plurality of rotary drive members.

Figure 2:
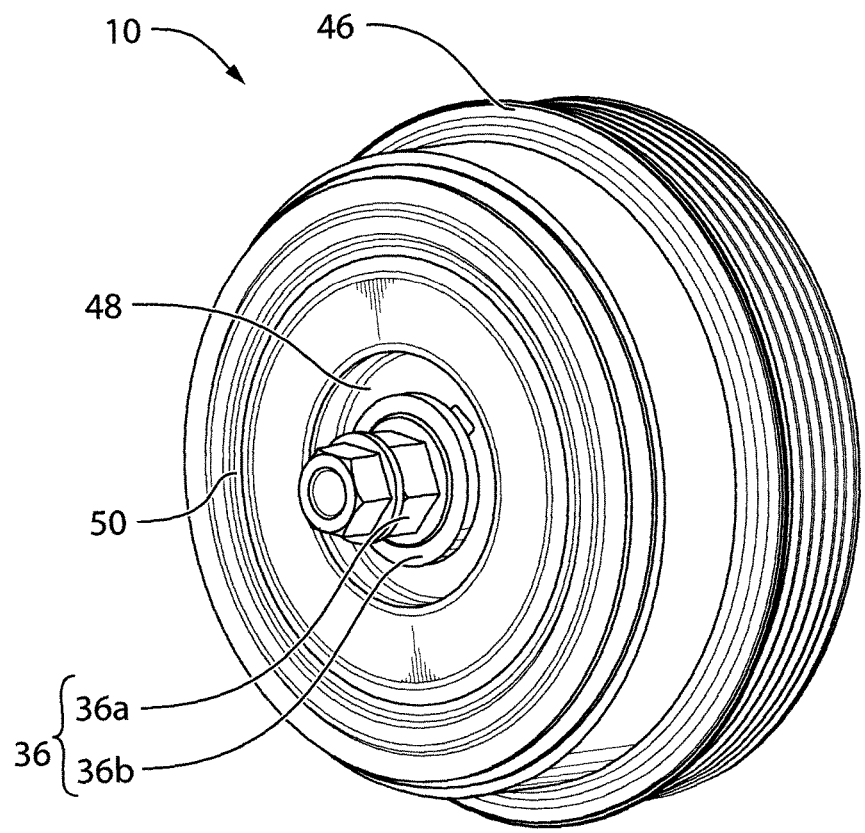
FIG. 2 is a perspective view of the isolator shown in FIG. 1.

FIG. 2 shows the isolator 10 alone. Referring to FIG. 2 and the exploded views in FIGS. 3 and 4, the isolator 10 includes a crankshaft driver 32 that mounts to the crankshaft 12 of FIG. 1 for rotation therewith. In the example embodiment shown in FIGS. 2-4, the crankshaft driver 32 mounts to a crankshaft extension 34 such that a first drive feature 37a (FIGS. 3 and 5) is received in and mates with a second drive feature 37b (FIG. 4) in the crankshaft driver 32. The crankshaft extension 34 further includes a plurality of lugs 35a (FIG. 4) that interlock with lugs 35b on the crankshaft 12. The crankshaft extension member 34 may also be referred as a shaft mounting member 34 since it does not necessarily have to extend the crankshaft 12. The driver 32 may in general be any element that is configured to transfer torque to and from the shaft that it is associated with (in this instance, the crankshaft 12).

Figure 5:
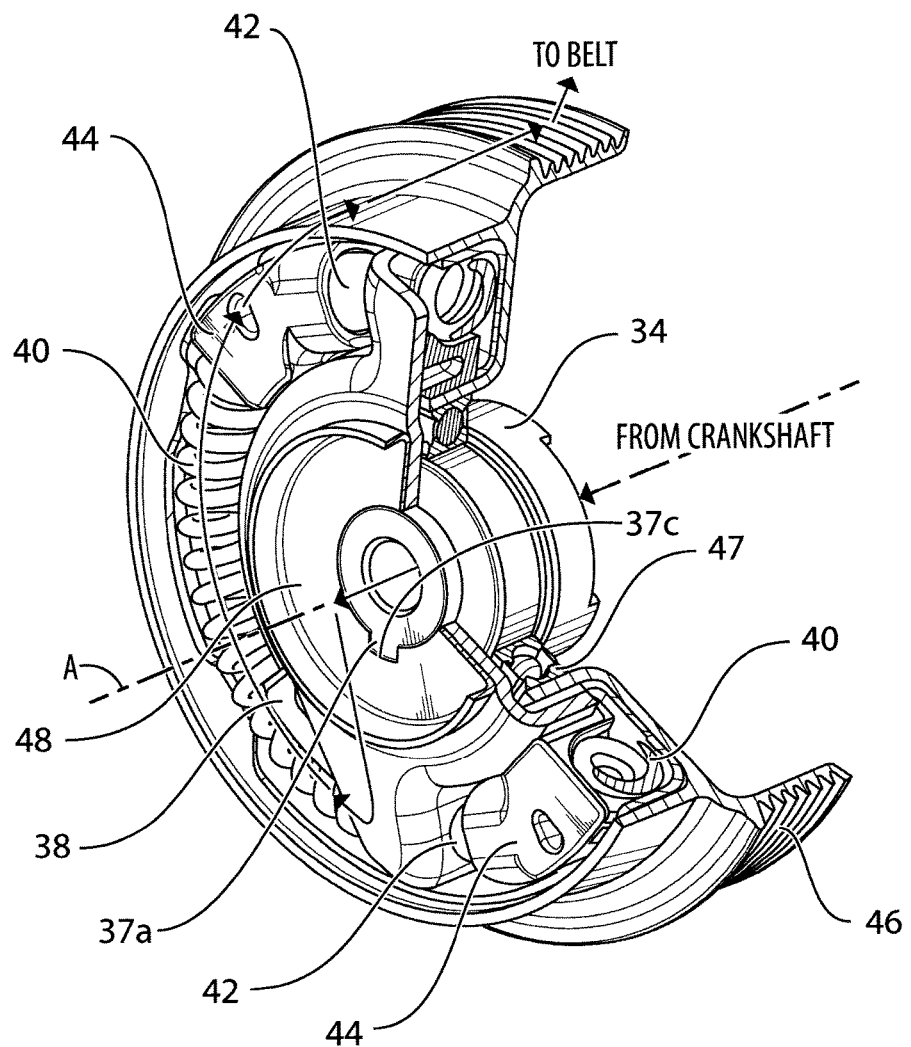
FIG. 5 is a perspective cutaway view of the isolator shown in FIG. 1, illustrating a torque path through the isolator from an engine crankshaft to a belt.

The isolator 10 further includes a bushing 38, a plurality of first isolation springs (i.e. first isolation springs) 40, a plurality of second isolation springs (i.e. second isolation springs) 42, a support member or housing, shown at 44 for each second isolation spring 42, a pulley or other rotary drive member 46 and a bearing 47 that is engaged between the pulley 46 and the shaft extension 34 (as shown in FIG. 5) and permits relative rotation therebetween.

The rotary drive member 46 is a first rotary drive member and is operatively connected to at least one second rotary drive member (in this instance a plurality of second rotary drive members including the alternator or MGU pulley 17, the power steering pump pulley 19, the water pump pulley 21 and the air conditioning compressor pulley 23. In the example shown in FIG. 1, the rotary drive member 46 is a pulley and is operatively connected to the second rotary drive members via the belt 14. However, in other embodiments, the rotary drive member 46 may, for example, be a first gear that is operatively connected to one or more second gears, such as, for example, an MGU gear, a power steering pump gear, a water pump gear and an air conditioning compressor gear, via direct or indirect engagement.

The first isolation springs 40 are positioned to transfer a torque from the driver 32 to the pulley 46 and not from the pulley 46 to the driver 32 during rotation of the driver 32 in a first rotational direction DIR1 (FIG. 1). The second isolation springs 42 are positioned to transfer a torque from the pulley 46 to the driver 32 during rotation of the pulley 46 in the first direction DIR1.

Figure 2A:
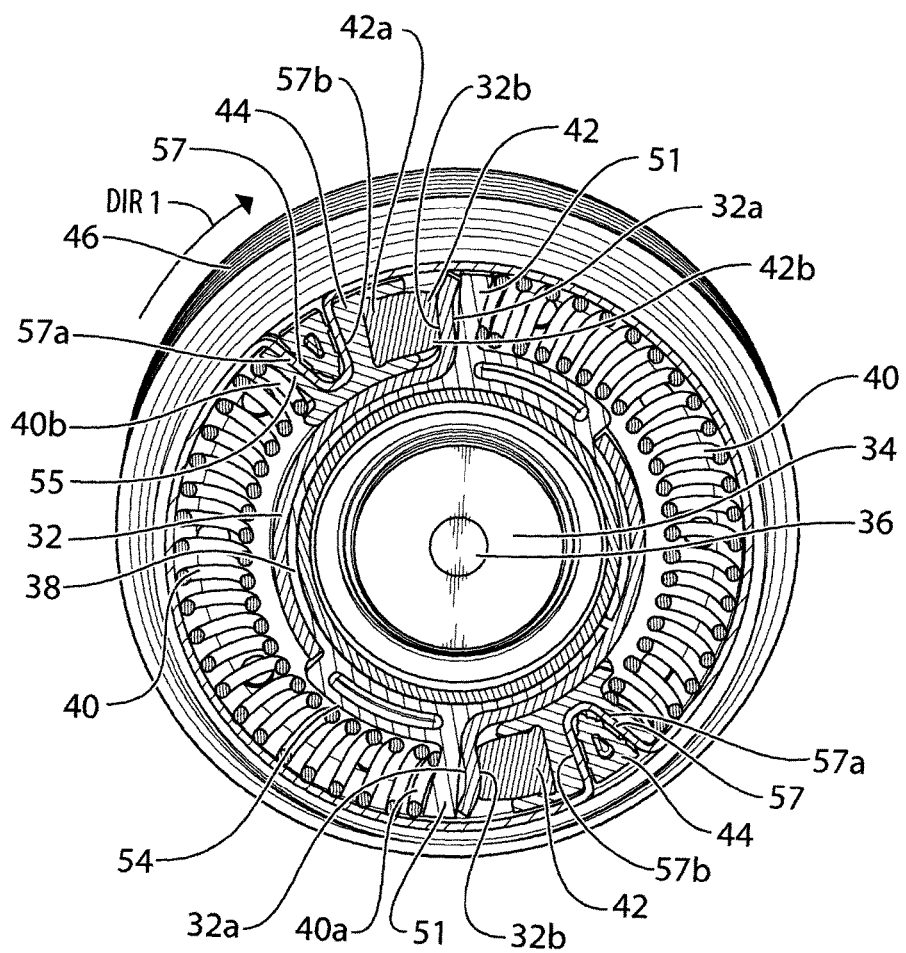
FIG. 2a is a sectional view of the isolator shown in FIG. 1.

Put another way, when torque is transferred from the crankshaft 12 (FIG. 1) to the pulley 46 to drive the pulley 46 in a first rotational direction DIR1, it is transferred through the first isolation springs 40 (FIG. 2A) and is not transferred through the second isolation springs 42. In the example shown in FIG. 2A, the crankshaft 12 transfers torque to the crankshaft driver 32 via the crankshaft extension 34. First isolation spring drive surfaces 32a on one side of radial projections 84 on the crankshaft driver 32 transfer torque from the crankshaft driver 32 into first ends 40a of the first isolation springs 40.

In embodiments wherein the crankshaft driver 32 and the first isolation springs 40 are all made from a metal, a noise reduction member 51, which may be made from a polymeric material, may be provided between each isolation spring drive surface 32a and the first end 40a of each of the isolation springs 40, so as to eliminate metal-to-metal contact therebetween. In the embodiment shown, the noise reduction members 51 are integral with the bushing 38, which reduces their cost since the bushing 38 and the noise reduction members 51 can all be molded in one step as one piece.

Torque is transferred from second ends 40b of the first isolation springs 40 into the pulley 46 via first isolation spring force receiving surfaces 57a on drive features 57 on the pulley 46. Noise reduction members 55, which may be polymeric, may be provided between the second ends 40b of the isolation springs 40 and the first isolation spring force receiving surfaces 46a on the pulley 46 in embodiments wherein the springs 40 and the pulley 46 are all made from metal. In the embodiment shown in FIGS. 2-6, the noise reduction members 55 are integral with the housings 44 for the second isolation springs 42. Forming the noise reduction members 55 integrally with the housings 44 by molding them all in one step reduces the cost of the noise reduction 55.

The noise reduction members 51 may be referred to as first noise reduction members 51 and the noise reduction members 55 may be referred to as second noise reduction members 55. Alternatively, the noise reduction members 55 may be referred to as first noise reduction members 55 and the noise reduction members 51 may be referred to as second noise reduction members 51.

The ends 40a and 40b of each first isolation spring 40 may abut the noise reduction members 51 and 55 respectively, or they may be connected fixedly to them.

When torque is transferred from the pulley 46 (FIG. 1) to the crankshaft 12 to drive the crankshaft 12 in the first rotational direction DIR1, the torque is transferred through the second isolation springs 42 (FIG. 2A) and is not transferred through the first isolation springs 40. In the example shown in FIG. 2A, the pulley 46 transfers torque to the second isolation springs 42 via second isolation spring drive surfaces 57b and via the housings 44 which hold the springs 42 and which are mounted to drive features 57 on the pulley 46. The drive features 57 have both the surfaces 57a and 57b thereon.

Torque is transferred from the pulley 46 into first ends 42a of the second isolation springs 42 and from second ends 42b of the isolation springs 42 into second isolation spring force receiving surfaces 32b on the crankshaft driver 32, and therefore into the crankshaft 12.

The support members 44 and the bushing 38 may be made from any suitable material such as a polymeric material such as a suitable type of nylon that may be reinforced with glass fibre.

The bushing 38 may have two arcuate spring support portions 54 that support a portion of the arcuate length of the first isolation springs 40. These support surfaces 54 also prevent contact of selected portions of the springs 40 with the crankshaft driver 32. These support portions 54 may also serve to loosely control the angular position of the bushing 38 relative to the crankshaft driver 32 by fitting into openings 56 in a circumferential wall 58 of the crankshaft driver 32.

A seal cap 48 that includes a third drive feature 37c mounts to the crankshaft extension 34 and mates with the first drive feature 37a on the crankshaft extension 34, so that the seal cap 48 rotates with the crankshaft 12. The seal cap 48 cooperates with a seal cover 50 that mounts for rotation with the pulley 46 to inhibit dust and moisture from entering the isolator 10. A fastener 36 (FIG. 2) which may include a hex flange bolt 36a and a washer 36b retain the seal cap 48, the crankshaft driver 32 (FIG. 4) and the crankshaft extension 34 on the crankshaft 12.

The first isolation springs 40 may be any suitable type of springs. For example, they may be helical compression springs that extend along an arcuate path. The springs 40 may have a rest or neutral position in which they extend along an arcuate path, or alternatively they may be constrained to extend along an arcuate path by the wall of the pulley 46. In an alternative embodiment the first isolation springs 40 may be some other type of springs, such as, for example, closed-cell foam springs as shown at 200 in FIG. 3a. The closed-cell foam springs 200 may have a displacement-force relationship that is linear, in the sense that along a selected range of displacement away from a neutral position the springs 200 exhibit a force that increases linearly with displacement. Alternatively, the closed-cell foam springs 200 may have a displacement-force relationship that is non-linear. For example, the closed-cell foam springs 200 may each be formed from a plurality of segments each of which has a different density, so that the spring force increases linearly with a first selected rate during compression of a first segment, and then the spring force increases linearly with a second selected rate that is higher than the first selected rate during compression of a second segment once the first segment is compressed by a certain amount, and so on. Alternatively, each closed-cell foam spring 200 may be formed as a single segment having a consistent density but which has a cross-sectional area that varies along the length of the spring 200. The variation in cross-sectional area impacts the spring force in the sense that regions of smaller cross-sectional area will have a smaller spring force associated therewith than regions of larger cross-sectional area. It will be noted that the isolator 10 may include closed-cell foam springs regardless of what type of second isolation springs 42 are provided. In such an embodiment the support members 44 and the bushing 38 may be omitted if desired since the closed-cell foam spring 200 is not metallic and thus the bushing 38 and the support members 44 are not needed to prevent metal-to-metal contact.

By providing a spring force that increases non-linearly, the isolator 10 can provide a relatively low spring rate in an initial portion of the spring's travel, and then a higher spring rate to inhibit situations where the crankshaft 12 causes the spring 200 to fully compress, or bottom out, which can lead to high stresses on many components including components of the isolator 10 and the crankshaft 12 itself, and which could lead to noise and vibration being emitted from the isolator.

The first isolation springs 40 may be configured to be displaced from their neutral positions in all positions of the isolator 10. In other words, regardless of the amount of torque being provided by the crankshaft 12, the first isolation springs 40 may be displaced away from their neutral position. In embodiments wherein the isolation springs 40 are compression springs (e.g. helical compression springs, or closed-cell foam springs), this means that they would always be in a state of compression even during transitions.

Instead of the first isolation springs being helical compression springs or closed-cell foam springs, they may alternatively be any other suitable type of springs such as coil tension springs or rubber members. While two first isolation springs 40 are shown, there could alternatively be as few as one isolation spring 40, or three or more isolation springs 40. In cases where a plurality of isolation springs 40 are provided, they may have polar symmetry about the axis A of rotation of the pulley 46 and the crankshaft driver 32 (i.e. they may be spaced equally about the axis of rotation of the pulley 46 and the crankshaft driver 32).

In some embodiments, such as embodiments wherein the first isolation springs 40 are closed-cell foam, they may provide some damping so as to dampen motion induced by torsional vibrations that can occur during operation of the engine 13. By dampening the motion, torsional vibrations are less likely to result in resonance and increased angular movement in the pulley 46. Closed-cell foam is particularly advantageous with respect to damping as it can provide damping from its own compression with no need for it to frictionally engage an adjacent component. Furthermore, just as the spring rate of a closed-cell foam spring can be tailored as desired for a particular application so as to provide a non-linear response to compression, such a spring can also provide a tailored amount of damping during compression.

The second isolation springs 42 may have any suitable configuration. For example, the second isolation springs 42 may be made from a rubber material, closed-cell foam, or they may alternatively be coil springs (e.g. helical compression springs). In some embodiments the second isolation springs 42 may be configured so that they provide a linear response in terms of a spring force-displacement relationship, or alternatively, they may be configured so as to provide a non-linear response to displacement. For example, as shown in the magnified view shown in FIG. 7, in some embodiments the second isolation springs 42 may include a body portion 62 that has a substantially constant cross-sectional area (and which may be generally cylindrical), and a contact head that is engageable with the crankshaft driver 32 that tapers towards a free end 66 of the second isolation spring 42. The particular shape of the contact head 64 may be generally ellipsoidal. The contact head 64 may alternatively have some other shape such as a generally conical shape with a rounded free end.

As a result of the shape of the contact head 64, the initial compression of the second isolation springs 42 is linear but the spring force increases relatively slowly with displacement. This reduces the likelihood of impact noises being emitted from the isolator 10 during impact of the crankshaft driver 32 and the isolation springs 42. Such impacts can occur during certain events as will be discussed further below. After the initial amount of compression has taken place, further compression of the isolation spring 42 causes radial expansion of the body portion 62, which is constrained by the wall of the support member 44, shown at 63. The shape of the wall 63 may be tailored as desired to generate a desired increase in the spring rate of the springs 42. In some embodiments, the springs 42 and the wall 63 may be configured such that the springs 42 have a force-displacement relationship wherein displacement of each second isolation spring 42 over a selected range of movement away from a neutral position generates a greater-than-linear increase in biasing force. Any other way of generating a non-linear (e.g. a greater than linear) force response to displacement may be utilized, such as any of the ways described above for the first isolation springs 40.

By providing a spring force that increases non-linearly, the isolator 10 can inhibit situations where the crankshaft 12 causes the isolation springs 42 to fully compress, or bottom out permitting direct engagement between the crankshaft driver 32 and the support members 44, which can lead to high stresses on many components including components of the isolator 10 and the crankshaft 12 itself, and which can lead to noise and vibration being emitted from the isolator.

During compression of the second isolation spring 42, in certain embodiments (e.g. wherein it is made from rubber or the like), the member 42 may expand radially and will rub the wall of the support member 44 (shown at 67 in FIG. 7A) as the member 42 compresses, particularly as the body portion 62 compresses. In such embodiments, the rubbing of the body portion 62 against the support member 44 may generate some amount of damping.

While two second isolation springs 42 are shown, there could alternatively be as few as one isolation spring 42, or three or more isolation springs 42. In cases where a plurality of isolation springs 42 are provided, they may have polar symmetry about the axis of rotation of the pulley 46 and the crankshaft driver 32 (i.e. they may be spaced equally about the axis of rotation of the pulley 46 and the crankshaft driver 32).

When the isolator 10 operates in a 'normal', or 'power-from-engine' mode whereby the engine crankshaft 12 drives the pulley 46 and therefore the belt 14, the torque path through the isolator 10 is as shown by the arrows 52 shown in FIG. 5. The crankshaft extension 34 is driven by the crankshaft 12 (FIG. 1), and in turn drives the first isolation springs 40 through the noise reduction members 51. The first isolation springs 40 in turn drive the pulley 46 through the noise reduction members 55, while at least partially isolating the pulley 46 from torsional vibrations at the crankshaft 12 that are the result of variations in torque that occur in internal combustion engines and particular those with certain cylinder counts such as four- or three-cylinder engines, and diesel engines.

Figure 6:
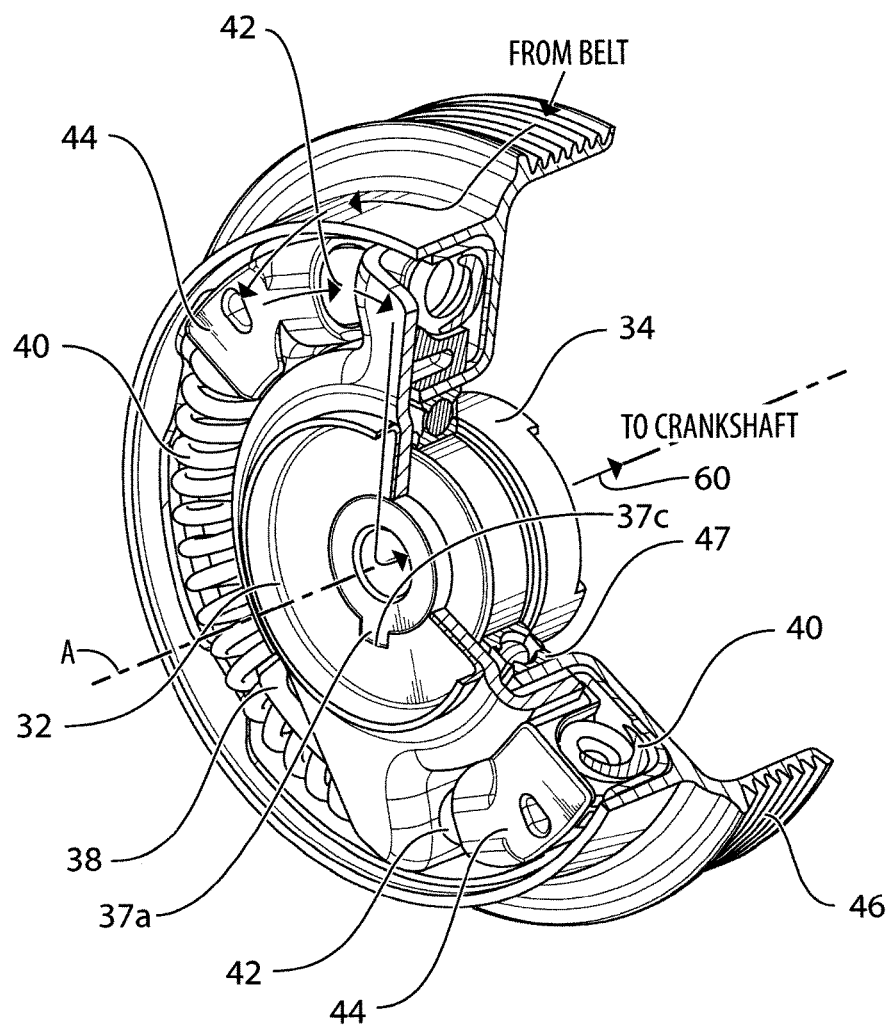
FIG. 6 is a perspective cutaway view of the isolator shown in FIG. 1, illustrating a torque path through the isolator from a belt to an engine crankshaft.

When the isolator 10 operates in a BAS, 'boost' or 'power-from-supplemental-motor' mode whereby the engine crankshaft 12 is receives torque from the belt 14 via the pulley 46, the torque path through the isolator 10 is as shown by the arrows 60 shown in FIG. 6. As shown, the pulley 46 is driven by the belt 14 (FIG. 1), and in turn drives the second isolation springs 42 through the support members 44. The second isolation springs 42 in turn drive the crankshaft driver 32. The crankshaft driver 32 in turn drives the crankshaft 12 (FIG. 1) through the crankshaft extension 34.

Figure 8:
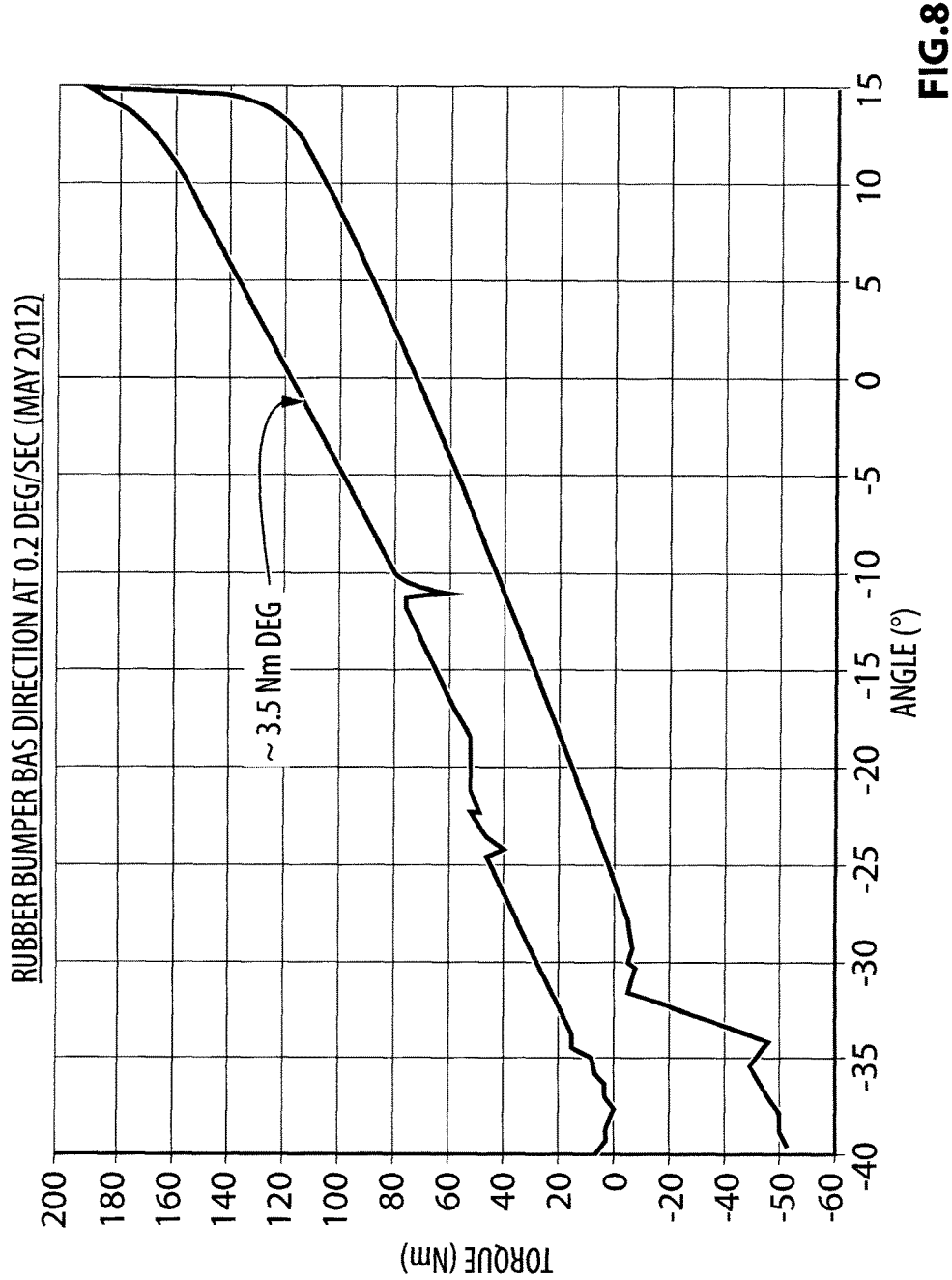
FIGS. 8 and 9 illustrate the torque transmitted through the isolator in relation to the relative angular displacement between a pulley and the crankshaft.
Figure 9:
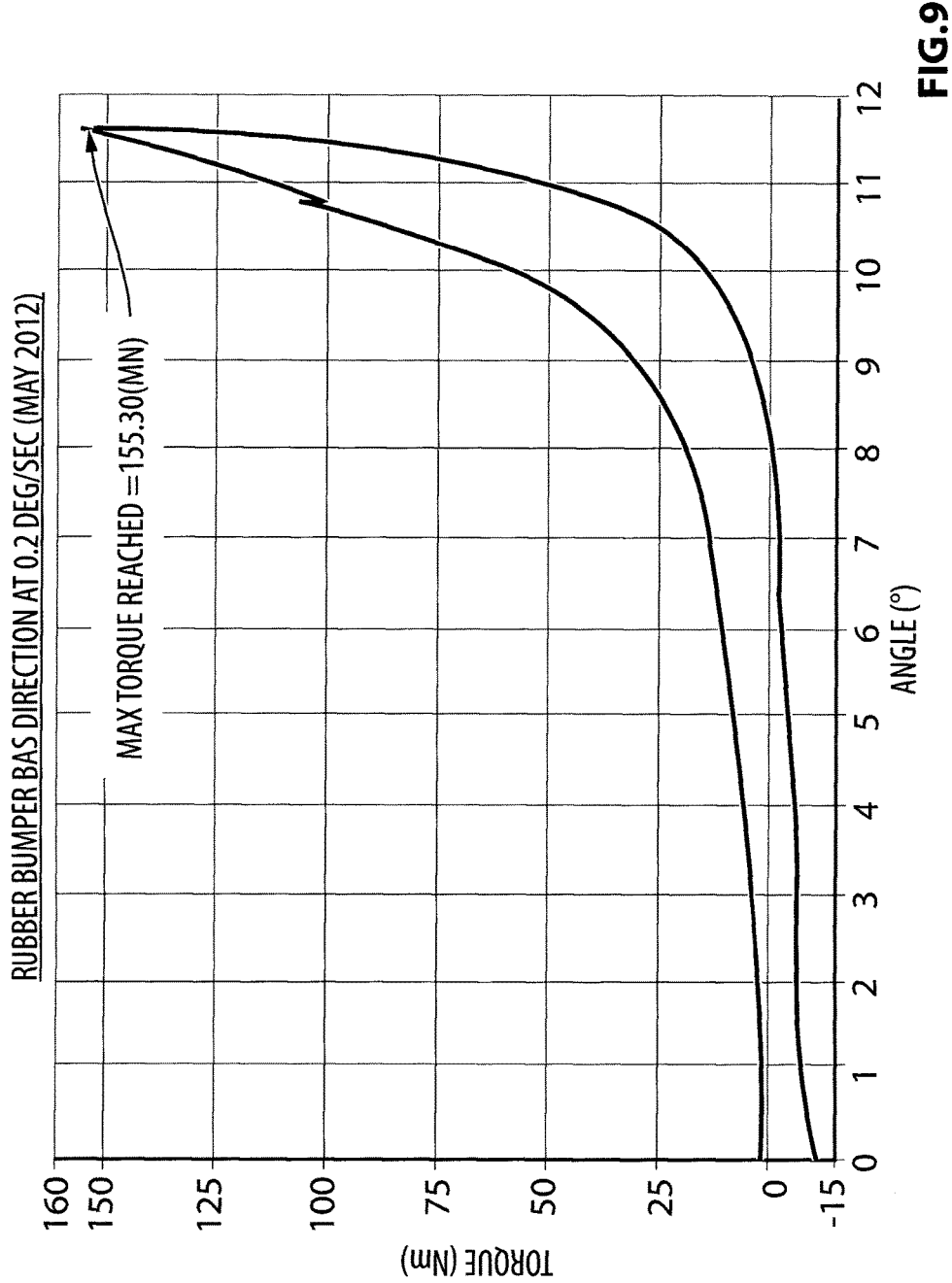
Figure 10:
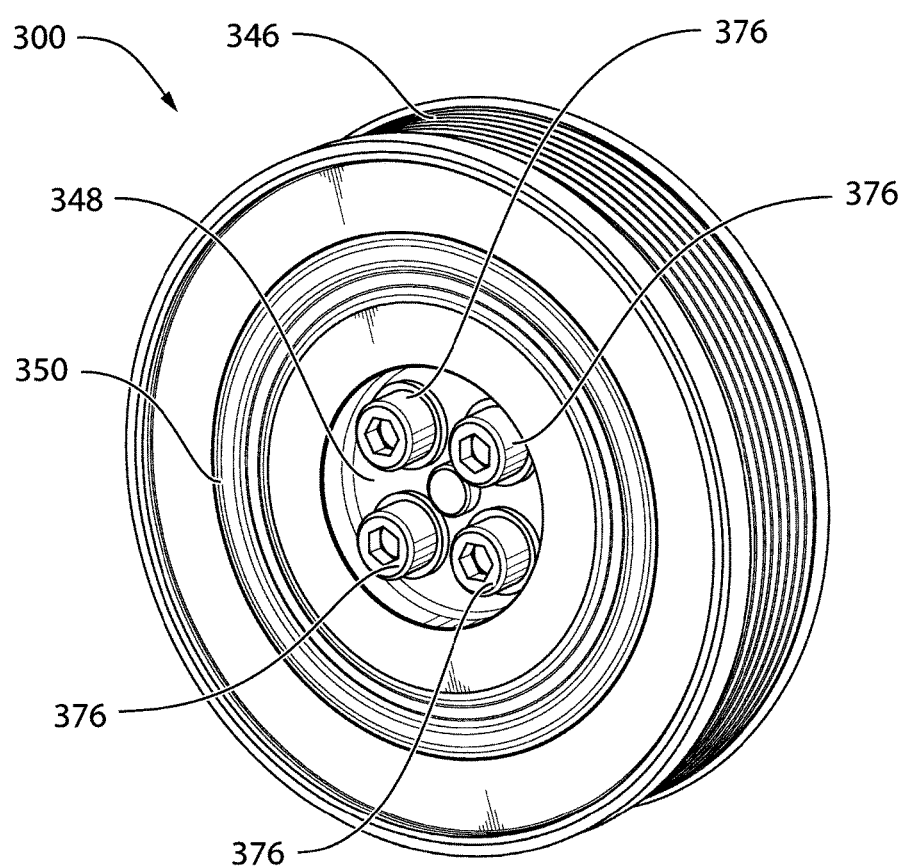
FIG. 10 is a perspective view of an isolator in accordance with another embodiment of the present invention.

FIGS. 8 and 9 illustrate the biasing force to displacement relationship for the isolator 10, based on the angular position of the crankshaft driver 32 relative to the pulley 46. Referring to FIG. 8 the response during compression of the first isolation springs 40 may be relatively linear. Referring to FIG. 9, the response during compression of the second isolation springs 42 may be linear (and small) initially and may then increase in a greater-than-linear manner after some selected amount of displacement. Some hysteresis may also be observed in both FIGS. 8 and 9, as a result of damping that may result from the reasons described above (in relation to the hysteresis in FIG. 9), and from displacement of the first isolation springs 40 in embodiments where they are coil springs (in relation to the hysteresis in FIG. 8).

By providing separate first and second isolation springs 40 and 42, the response of the isolator 10 can be tailored in different ways when the crankshaft 12 is driving the belt 14 versus when the belt 14 is driving the crankshaft 12 so as to address the different torsional events that can occur in each situation. In some embodiments, the second isolation springs 42 may be configured to provide shock absorption during engine startup via the belt, whereas the first isolation springs 40 may be configured to provide isolation from torsional vibrations and the like.

While the noise reduction members 51 and 55 are beneficial to inhibit metal-to-metal contact between the first isolation springs 40 and other components, the noise reduction members 51 and 55 are optional and could be omitted.

Events can occur that can cause separation of the crankshaft driver 32 from the isolation springs 42. During operation in the 'normal' mode for example, it is possible that the crankshaft driver 32 will receive a sudden torque increase from the crankshaft 12 due to torsional vibrations at the crankshaft 12 as described above. Additionally an event can occur where there is a sudden increase in resistance to movement from the belt 14, such as when a load at an accessory increases, such as when the alternator is used to generate electricity. Depending on the severity of such events the crankshaft driver 32 may be driven by the crankshaft 12 away from the second isolation springs 42. As the torque at the crankshaft 12 is reduced or as the load at the accessories is reduced, the crankshaft driver 32 returns to engage the isolation springs 42 and thus there is some amount of impact between the crankshaft driver 32 and the isolation springs 42. It is advantageous to configure the second isolation springs to provide a relatively low resistance to compression during their impacts from the crankshaft driver 32. In some embodiments, such as embodiments where helical compression springs or closed-cell foam springs are used for the isolation springs 42, the isolation springs 42 may have sufficient amounts of compression available to them that they can be sufficiently long so that they are always in contact with the crankshaft driver 32 even during high torque or high resistance events described above.

Figure 11:
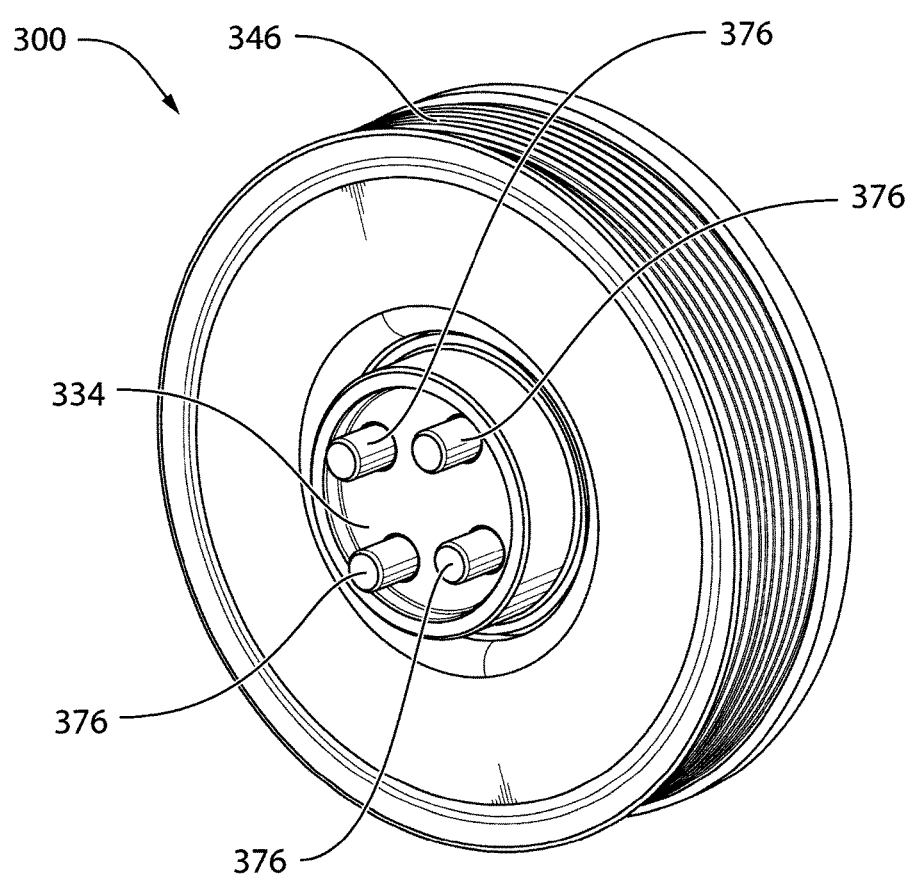
FIG. 11 is another perspective view of the isolator shown in FIG. 10.

An embodiment of an isolator having such isolation springs is described further below and is shown at 300 in FIGS. 10-16. A component shown in FIGS. 10-16 having a reference number with the same last two digits as a the reference number for a counterpart component shown in FIGS. 3-7 will be understood to be similar to that counterpart component. As shown in FIG. 11, the isolator 300 includes a crankshaft driver 332 that mounts to the crankshaft 12 of FIG. 1 via a crankshaft extension 334, a bushing 338, a plurality of first isolation springs 340, a plurality of second isolation springs 342, a pulley or other rotary drive member 346 and a bearing 347. A seal cap and a seal cover are shown at 348 and 350 respectively.

Figure 3:
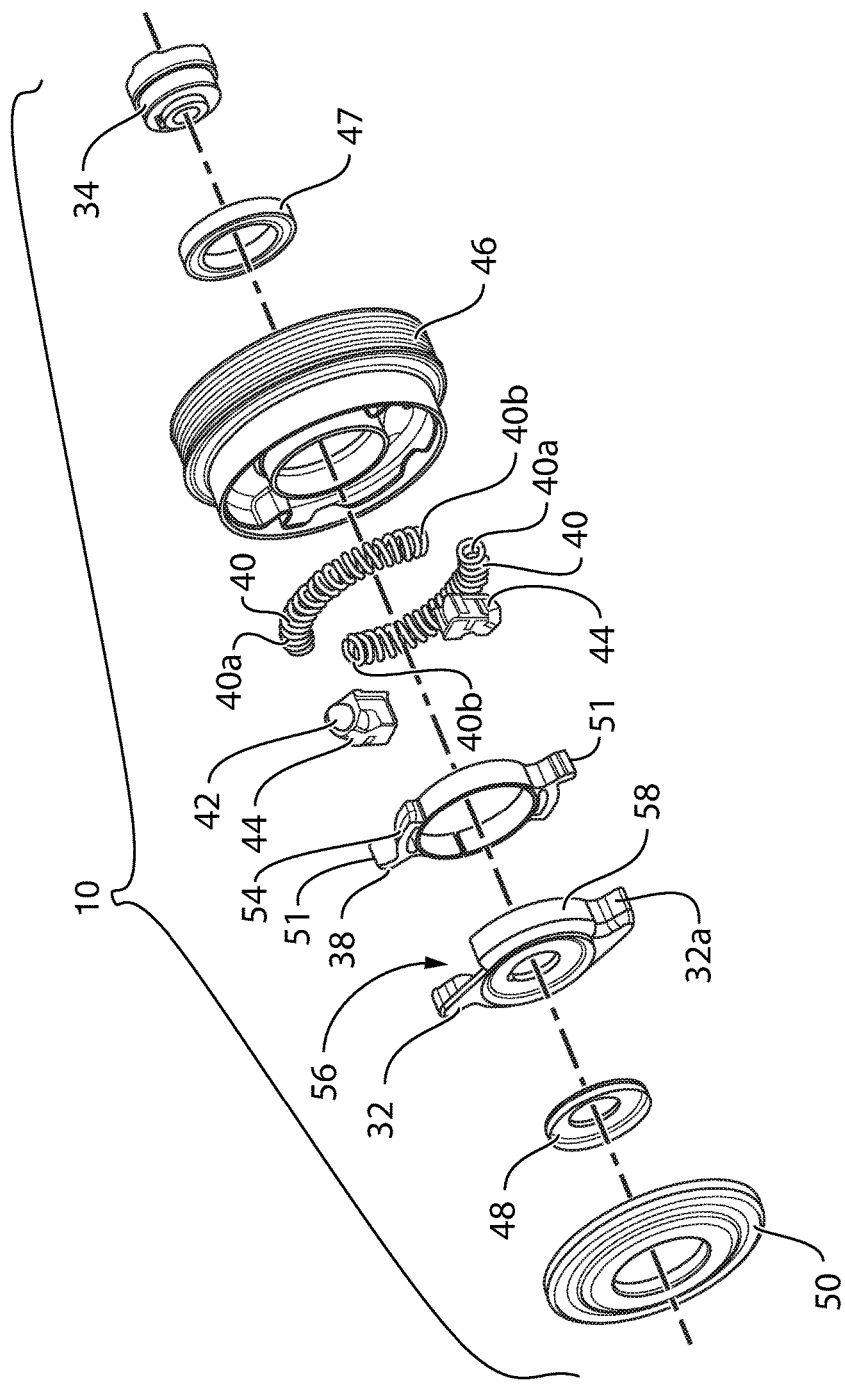
FIG. 3 is an exploded perspective view of the isolator shown in FIG. 1.
Figure 3A:
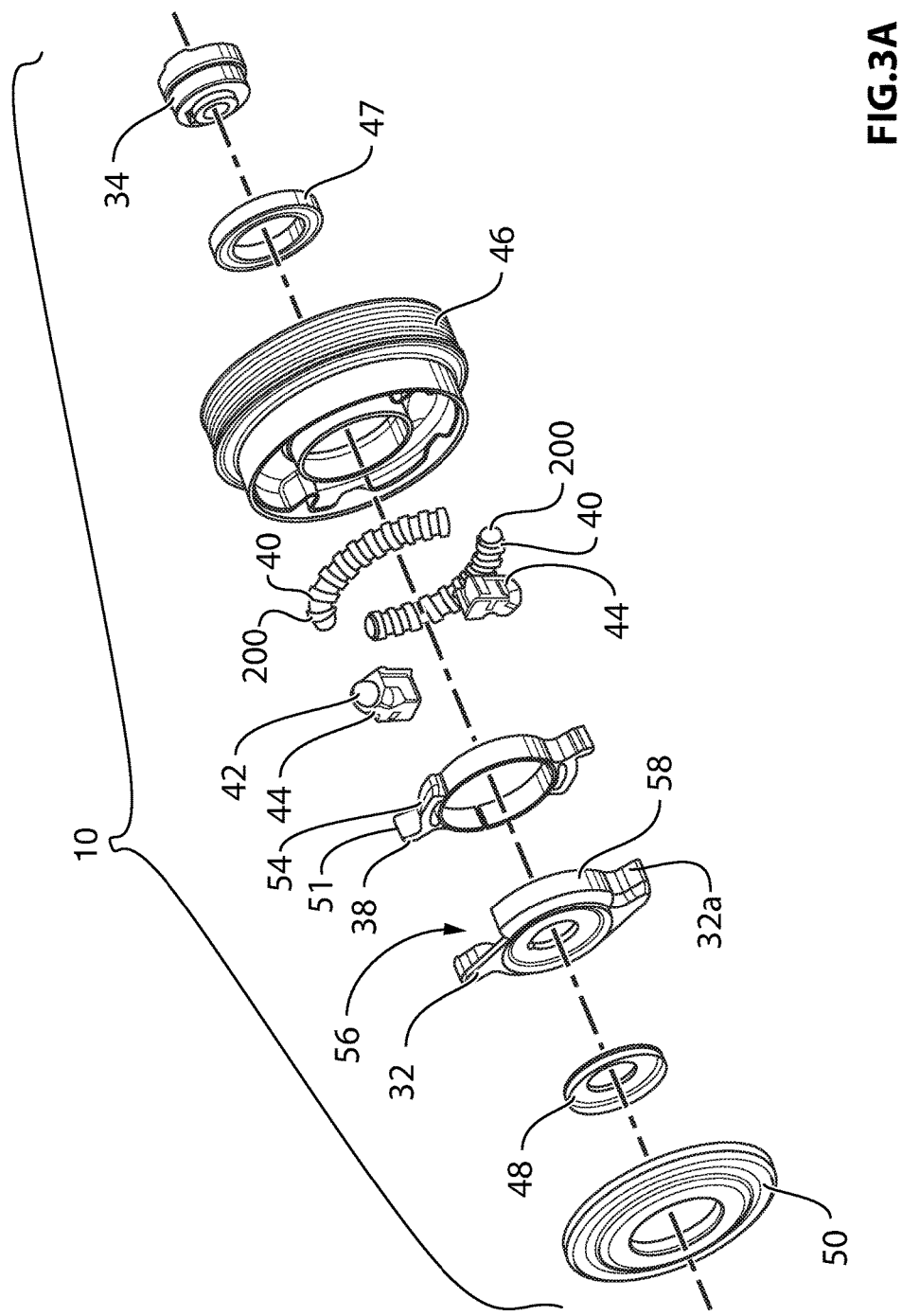
FIG. 3a is a perspective view of an alternative spring that can be used in the isolator shown in FIG. 3.

In similar manner to FIG. 3, the crankshaft extension 334 mounts to the crankshaft 12 of FIG. 1 (e.g. via threaded fasteners 376 shown in FIGS. 10 and 11) for co-rotation therewith, and the crankshaft driver 332 mounts to the crankshaft extension 334 (and thus may be said to mount to the crankshaft 12 at least indirectly) for co-rotation therewith. The threaded fasteners 376 (FIG. 10) pass through apertures 381 in the crankshaft extension 334 to hold the crankshaft driver 332 thereto. Any other suitable type of fastener or other fastening means may be used to connect the crankshaft driver 332 to the crankshaft 12.

Figure 14A:
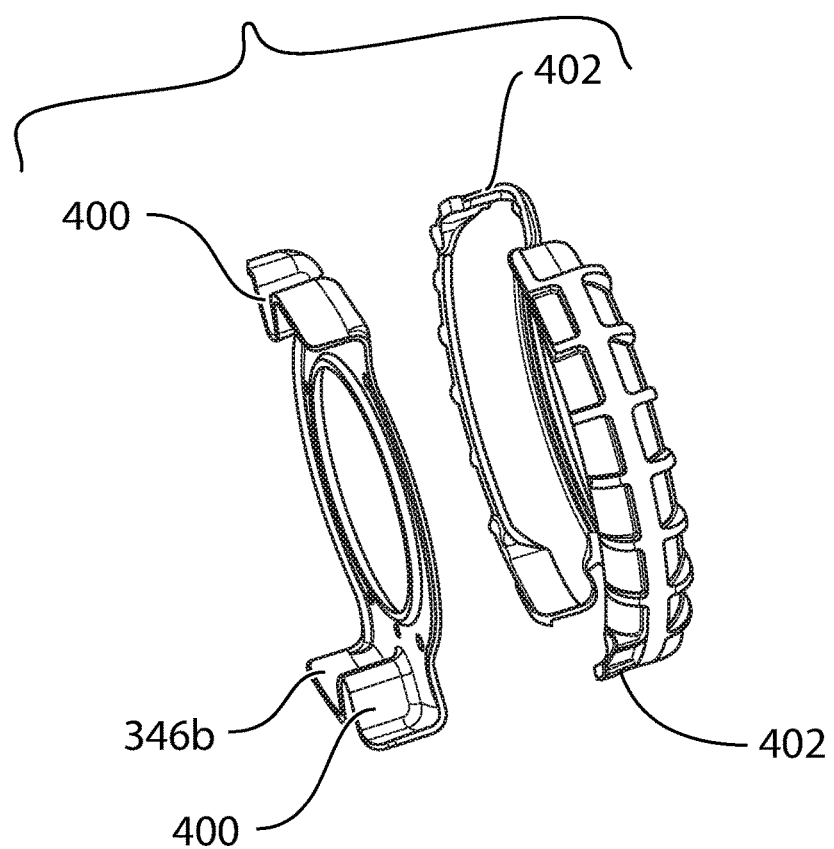
FIG. 14a is a perspective exploded view of some of the components in the isolator shown in FIG. 10.
Figure 14:
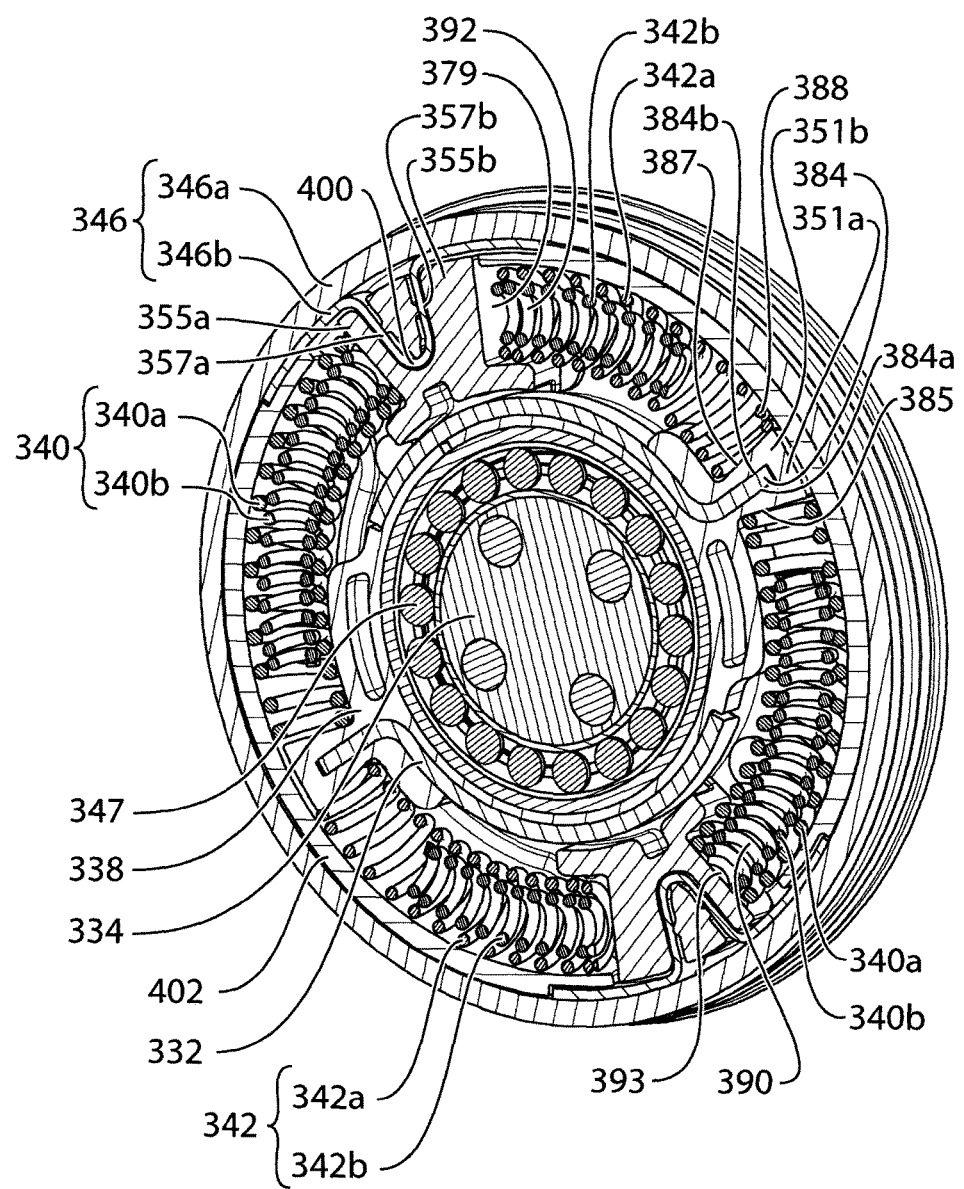
FIG. 14 is a perspective sectional view of the isolator shown in FIG. 10.

With reference to FIG. 14, the crankshaft driver 332 may have two radial projections 384 which project radially outwardly from an outer surface of the driver 332 and which may be spaced 180 degrees apart about the perimeter of the driver 332. One side of each radial projection 384 is a first isolation spring drive surface 384*a* (for transmitting a torque into the first isolation springs 340), and the other side is a second isolation spring force receiving surface 384*b* (for receiving a force and a torque from the second isolation springs 342).

The pulley 346 may have two radial projections 400 which project radially inwardly from an inner surface of the pulley 346 and which may be spaced 180 degrees apart about the inner perimeter of the pulley 346. One side of each radial projection 400 is a first isolation spring force receiving surface 357*a* (for receiving a force and a torque from the first isolation springs 340), and the other side is a second isolation spring drive surface 357*b* (for transmitting a torque into the second isolation springs 342).

As described above for the rotary drive member 46 (FIG. 1), the rotary drive member 346 may be something other than a pulley, such as, for example, a gear that is operatively connected to a plurality of second rotary drive members (e.g. second gears) on the accessories such as the MGU or alternator 16.

The bushing 338 includes two slots 383 (FIG. 12) that each receive an extension member 384 so that the bushing 338 is connected to and co-rotates with the crankshaft driver 332.

The bushing 338 has integrally formed therewith two first noise reduction members 351*a* that have first isolation spring abutment surfaces 385 (FIGS. 12 and 13) which abut first ends 386 of the first isolation springs 340 so as to prevent metal-to-metal contact between the first ends 386 of the first isolation springs 340 (in embodiments wherein the isolation springs 340 are metallic), and the first isolation spring drive surface 384*a* on the crankshaft driver 332, which may be metallic (e.g. made from steel). The bushing 338 further has integrally formed therewith two second noise reduction members 351*b* that have second isolation spring abutment surfaces 387 (FIGS. 12 and 13) which abut second ends 388 of the second isolation springs 342 so as to prevent metal-to-metal contact between the second ends 388 of the first isolation springs 340, and the second isolation spring force receiving surfaces 384*b* on the crankshaft driver 332 (in embodiments wherein the isolation springs 342 and the crankshaft driver 332 are metallic). The bushing 338 may further include two arcuate spring support portions 354 that support a portion of the arcuate length of the first isolation springs 340. These support surfaces 354 also prevent contact between selected portions of the springs 340 and the crankshaft driver 332.

The support members 344 each have integrally formed therewith first noise reduction members 355*a* that have abutment surfaces 393 thereon that abut second ends 390 of the first isolation springs 340 and prevent metal-to-metal contact between the second ends 390 of the first isolation springs 340 and the first isolation spring force receiving surfaces 357*a* on the pulley 346.

The support members 344 further have integrally formed therewith second noise reduction members 355*b* that have abutment surfaces 395 thereon that abut first ends 392 of the second isolation springs 340, and prevent metal-to-metal contact between the first ends 392 of the second isolation springs 342 and the second isolation spring drive surfaces 357*b* on the pulley 346. The support members 344 and the bushing 338 may be made from any suitable material such as a polymeric material such as a suitable type of nylon that may be reinforced with glass fiber.

A difference between the isolator 300 and the isolator 10 is that the plurality of second isolation springs 342 are helical compression springs. In the embodiment shown the plurality of second isolation springs 342 comprises outer springs 342*a* and inner springs 342*b*, instead of polymeric bumpers that are shown in FIG. 3. The outer springs 342*a* are positioned along an arcuate path between the housings 344 and the bushing 338. The outer springs 342*a* may have a rest length that is selected so that they are substantially always in a state of compression during use. Thus, the first end 388 may be substantially always engaged with the bushing 338 and thus the driver 332 and the second end 392 may be substantially always engaged with the support member 344 and thus the pulley, even under extreme conditions when the driver 332 has rotated far (clockwise in FIG. 12) relative to the pulley 346 such that the first isolation springs 340 are in a relatively high state of compression. Such extreme conditions can occur, for example, during engine startup when combustion finally begins in one of the engine cylinders, thereby accelerating the crankshaft 12 violently relative to the pulley 346.

By providing a spring 342a with the aforementioned selected rest length, a situation substantially never occurs where the bushing 338 separates from the spring 342a briefly and then impacts the spring 342a upon a reduction of acceleration of the crankshaft 12 relative to the pulley 346.

In order to control the resistive force of the spring 342a against compression when the pulley 346 is accelerated (clockwise in FIG. 12) relative to the crankshaft 12, the outer spring 342a may have a selected, low spring rate. Up to a selected amount of compression of the outer spring 342a, the inner spring 342b is in its rest state is not in compression. In extreme conditions when the acceleration of the pulley 346 is high relative to the crankshaft 12, the relative rotation therebetween brings abutment surfaces 391 and 387 sufficiently close together to initiate compression of the inner spring 342b. The spring rate of the inner spring 342b is selected to be sufficiently high that the sum total of the resistive forces of the springs 342a and 342b will match the force urging the pulley 346 to rotate relative to the crankshaft 12 before either of the springs 342a and 342b compress to the point where they are solid (i.e. to the point where all of the spring coils in one of the springs 342a or 342b contact one another, thereby precluding any further possible compression of either spring). In some embodiments, the spring rate of the inner spring 342b is higher than that of the outer spring 342a, although it will be noted that even in embodiments in which the spring rate of the inner spring 342b is equal to or less than that of the outer spring 342a, the overall spring rate that exists once the inner spring 342b is engaged is the sum of the first and second springs and is thus greater than the spring rate of the first spring alone, and could be selected to reach a sufficiently high spring force to prevent compression to the point where one of the springs 342a or 342b go solid.

Figure 15:
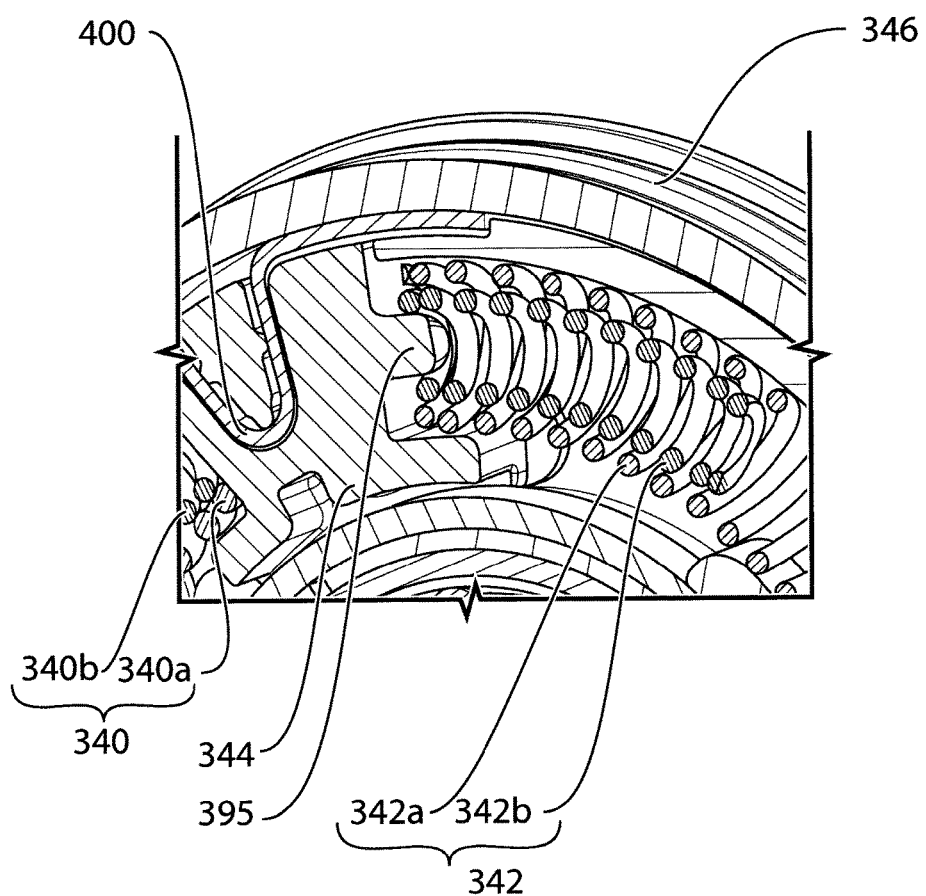
FIG. 15 is a perspective sectional view of a portion of the isolator shown in FIG. 10.

The ends of each outer spring 342a may simply abut the noise reduction members 355a and 355b respectively, or they may be connected fixedly to one or both of the noise reduction members 355a and 355b. As can be seen from FIG. 14, the inner spring 342b is shorter than the outer spring 342a, so that the inner spring 342b is only engaged after the outer spring 342a has compressed by a selected amount. The inner spring 342b is positioned in the space within the outer spring 342a, and may float between the noise reduction member 355a and noise reduction member 355b. Alternatively, as shown in FIG. 15, the inner spring 342b may be anchored at one end. For example, a lug 395 may be provided on the support member 344, wherein the lug 395 is sized to retain one or two (or some other number) of the coils at one end of the inner spring 342b.

For both the first isolation springs 340a and 340b, and for the second isolation spring 342a and 342b, the outer and inner spring each are helically wound in a selected direction. As can be seen best in FIG. 14 the outer and inner springs 340a and 340b may be helically wound in opposite directions (i.e. one spring may have a right handed helix while the other has a left-handed helix). This inhibits the coils from one spring from binding with the coils of the other spring. The same winding arrangement may be true for springs 342a and 342b. Alternatively, it may be possible to have the two springs 340a and 340b (and two the springs 342a and 342b) have helixes that have the same handedness.

In some embodiments, metal-to-metal contact may be more tolerable and one or more of the bushing 338 and the support members 344 may be omitted.

Figure 12:
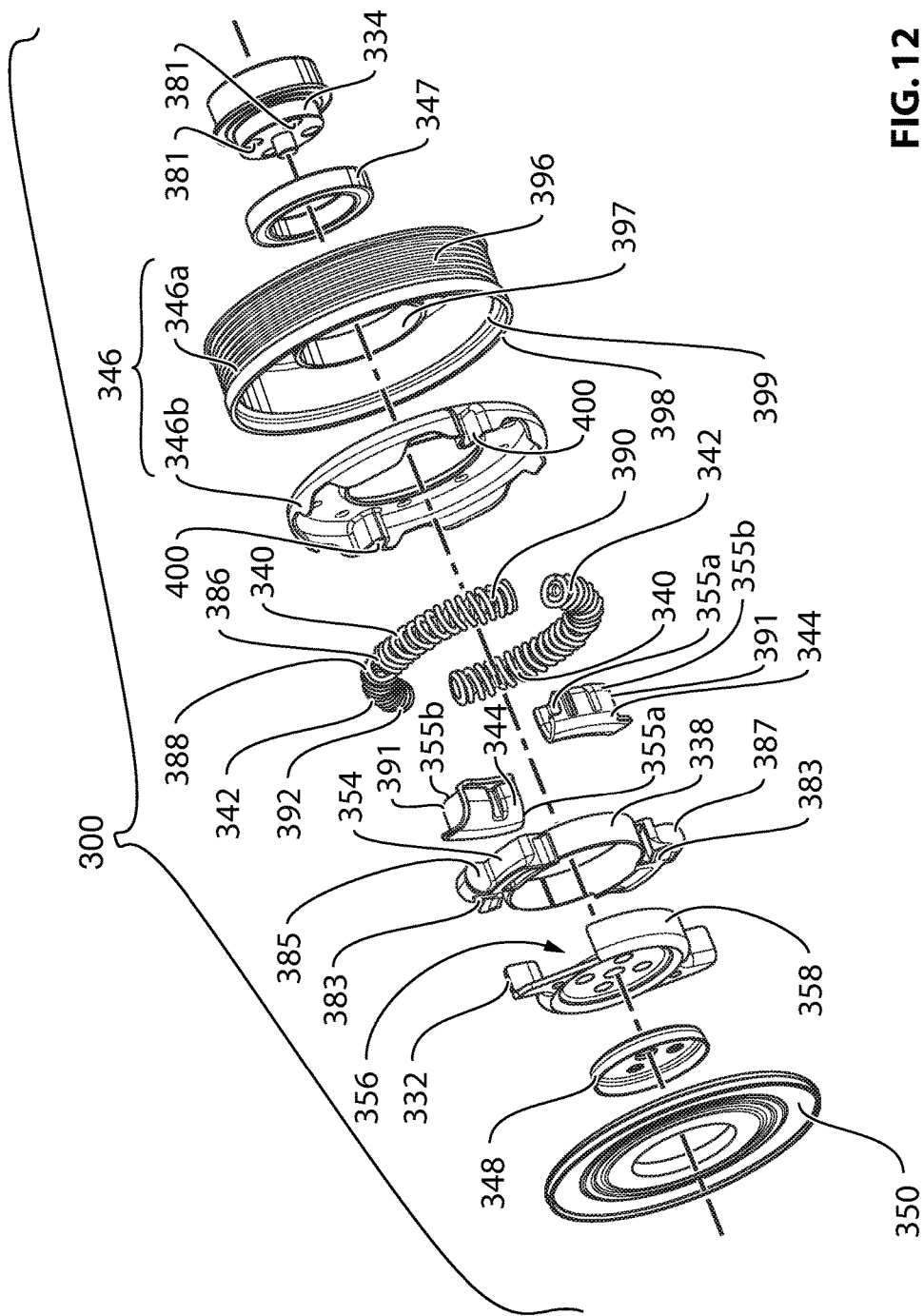
FIG. 12 is a perspective exploded view of the isolator shown in FIG. 10.

As shown in FIGS. 12 and 13 in particular, the pulley 346 may itself be made up of a first pulley member 346a and a second pulley member 346b. The first pulley member 346a may include the pulley grooves (shown at 396), and optionally may include substantially only circular features such as an inner bearing support surface, 397, a outer lip portion 398, and a shoulder 399. This makes the pulley portion 346a relatively easy to produce at low cost. The second pulley member 346b may be a relatively complex shape that is inserted into the first pulley portion 346a and is connected thereto by some suitable means, such as by rivets, by welding (e.g. laser welding or any other suitable type of welding technique). The second pulley member 346b may be a stamped piece, which may reduce the cost of its production. Thus each of the first and second pulley members may be made by different methods which are suited to low cost production, and may then be connected together. The first and second pulley portions 346a and 346b may both be made from a suitable material such as steel.

The second pulley member 346b may include such features as integrated spring shells for at least partially guiding the first and second isolation springs 340 and 342 along their arcuate paths. The second pulley member 346b may further include such features as the radial projections 400 to which the support members 344 mount.

Referring to FIG. 14, the plurality of first isolation springs 340 includes two spring arrangements, wherein each arrangement includes an outer helical compression spring 340a and an inner helical compression spring 340b, similar to the arrangement of the springs 342a and 342b. The outer spring 340a may be in compression throughout all conditions during use. The inner spring 340b is compressed only after the outer spring 340a has been compressed by a selected amount, at which point the two springs 340a and 340b act together to provide a combined spring rate that is higher than the spring rate of the outer spring 340a alone. The combined spring rate is selected to ensure that neither the first or second springs go solid in operation, even under extreme operating conditions.

As can also be seen in FIGS. 14 and 14a, it is optionally possible to include spring shells 402 that are polymeric and that are separate from the second pulley member 346b, to eliminate the metal to metal contact that would occur between springs 340a and 342a and the second pulley member 346b shown in FIGS. 12 and 13.

Figure 16:
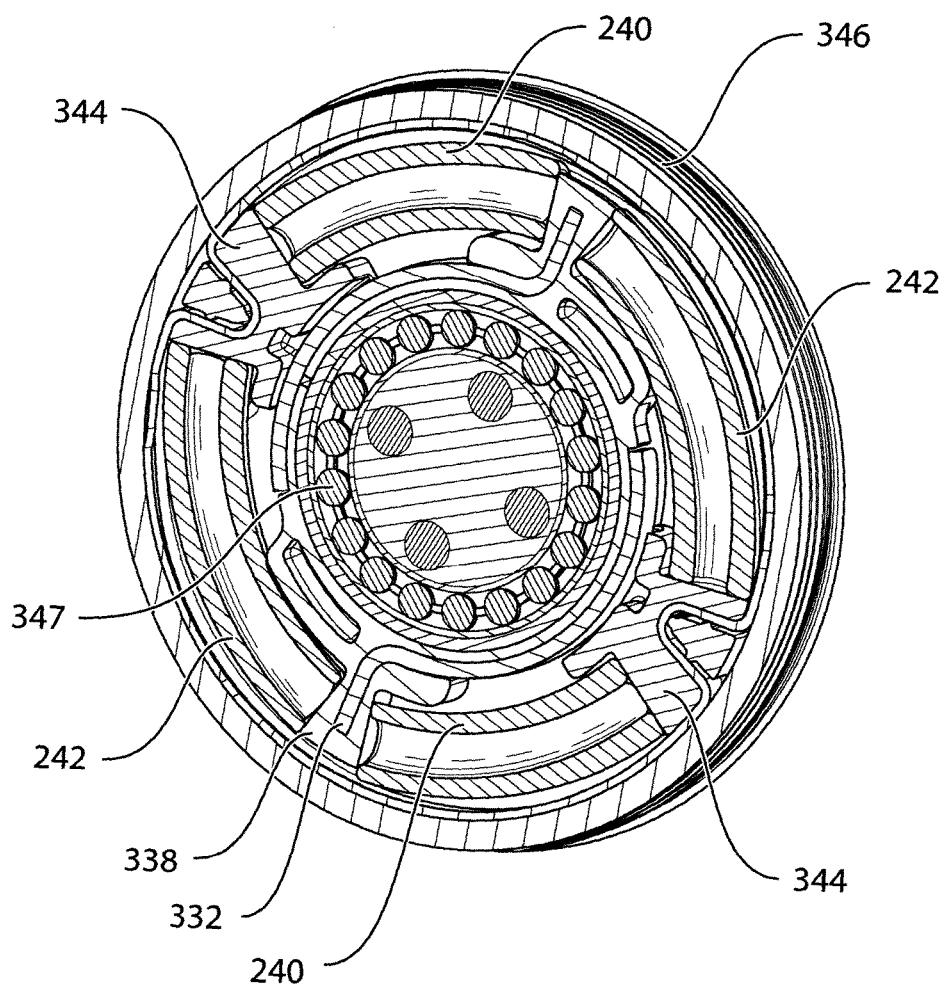
FIG. 16 is a perspective sectional view of a variant of the isolator shown in FIG. 10, which uses closed-cell foam springs.

Reference is made to FIG. 16, which shows another embodiment of the isolator 300, wherein both the first and second isolation springs are shown at 440 and 442 and are closed-cell foam springs respectively, and wherein their lengths are selected so that both springs remain in a state of compression at all times during use of the isolator 300, (i.e. even when there is no torque being transferred from the pulley 346 to the shaft 16a, and even in extreme conditions, such as during engine startup when decelerations and accelerations of the engine crankshaft 12 relative to the pulley 346). As can be seen, both the springs 440 and 442 have profiles that change along their length (e.g. that taper progressively from one end to the other). In the embodiment shown, the spring rate in each spring 440 and 442 increases progressively and non-linearly as the spring 440 or 442 is compressed further. Thus, the actual spring force exerted by the spring 440 or 442 increases non-linearly (e.g. exponentially).

Some components have been described as having two of a certain element, spaced 180 degrees apart. It will be understood that these components could alternatively have one of said element, or three or more of such elements. For example, the bushing 338 may have one slot 383 and the driver 332 may have one projection 384, or alternatively, the bushing 338 may have three slots 383 for receiving three projections 384. It is preferable, however, to maintain polar symmetry on all of the components.

The isolators described in relation to FIGS. 1-16 have been described as being configured to mount to an engine crankshaft 12. However, an isolator may be provided that mounts to the shaft of the MGU 16 (shown at 16a). Such an isolator is shown at 500 in FIGS. 17-21.

Figure 17:
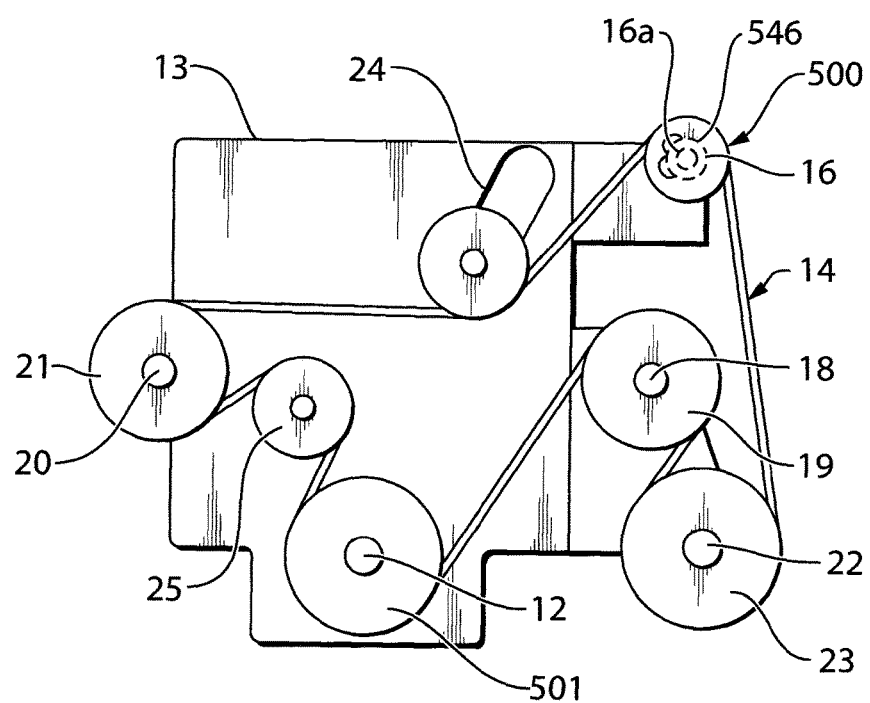
FIG. 17 is a side view of an engine in a vehicle containing an isolator on a shaft of an MGU, in accordance with another embodiment of the present invention.

As can be seen in FIG. 17, the crankshaft 12 in this example has a simple pulley 501 thereon. It is optionally possible however for both the crankshaft 12 and the MGU shaft 16a to have isolators as described herein.

Figure 18:
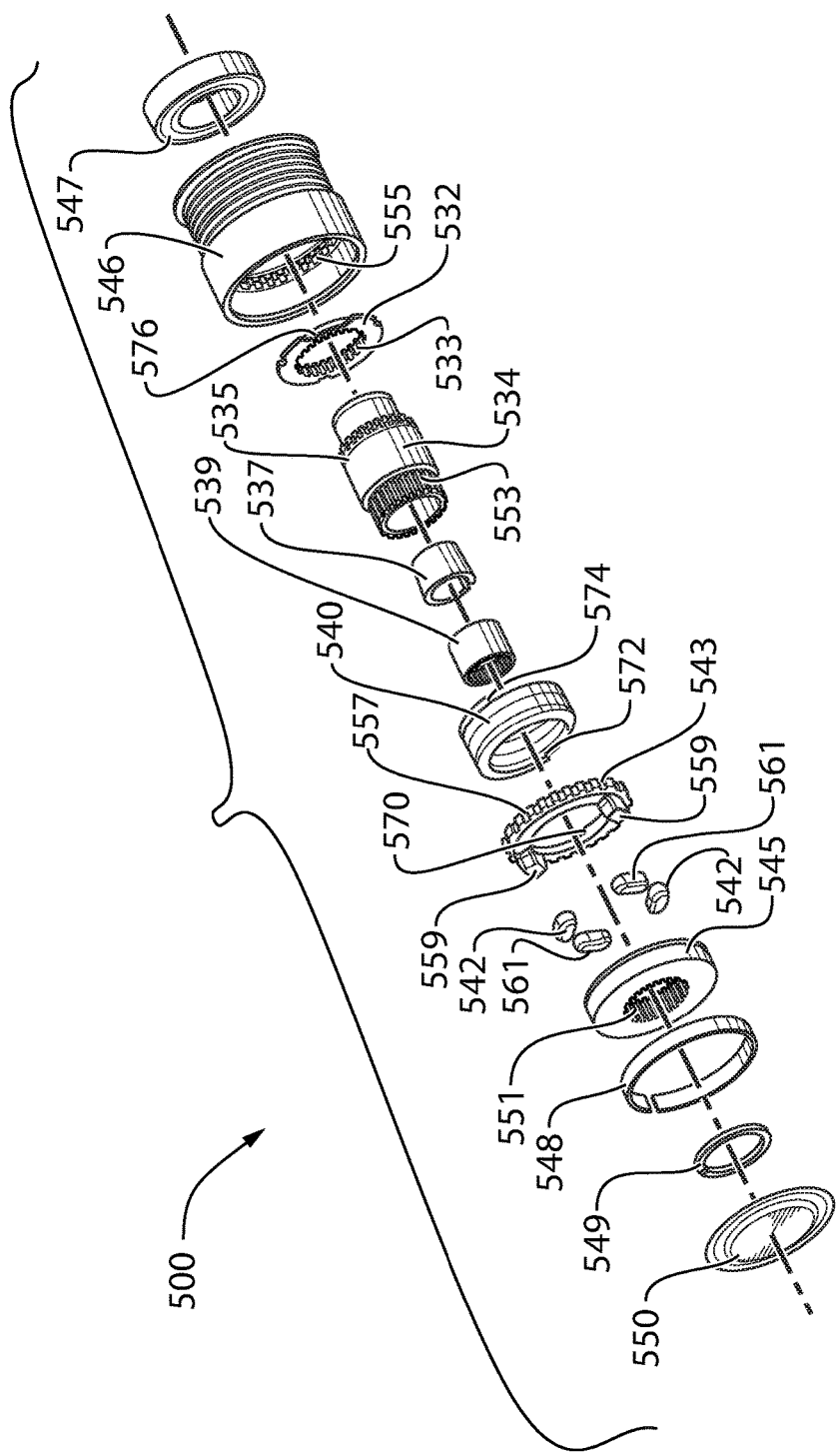
FIG. 18 is an exploded perspective view of the isolator shown in FIG. 17.
Figure 19:
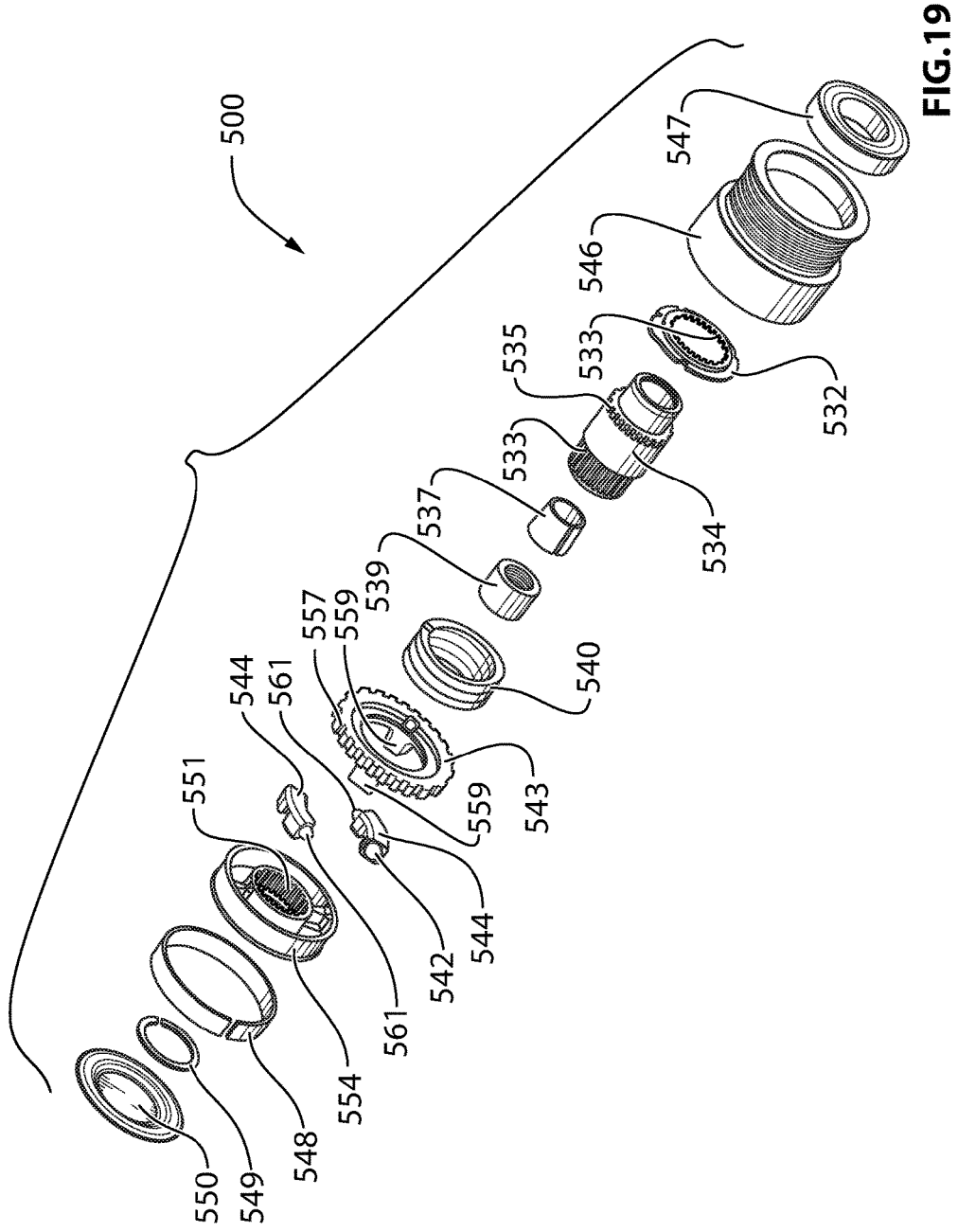
FIG. 19 is another exploded perspective view of the isolator shown in FIG. 17.
Figure 20:
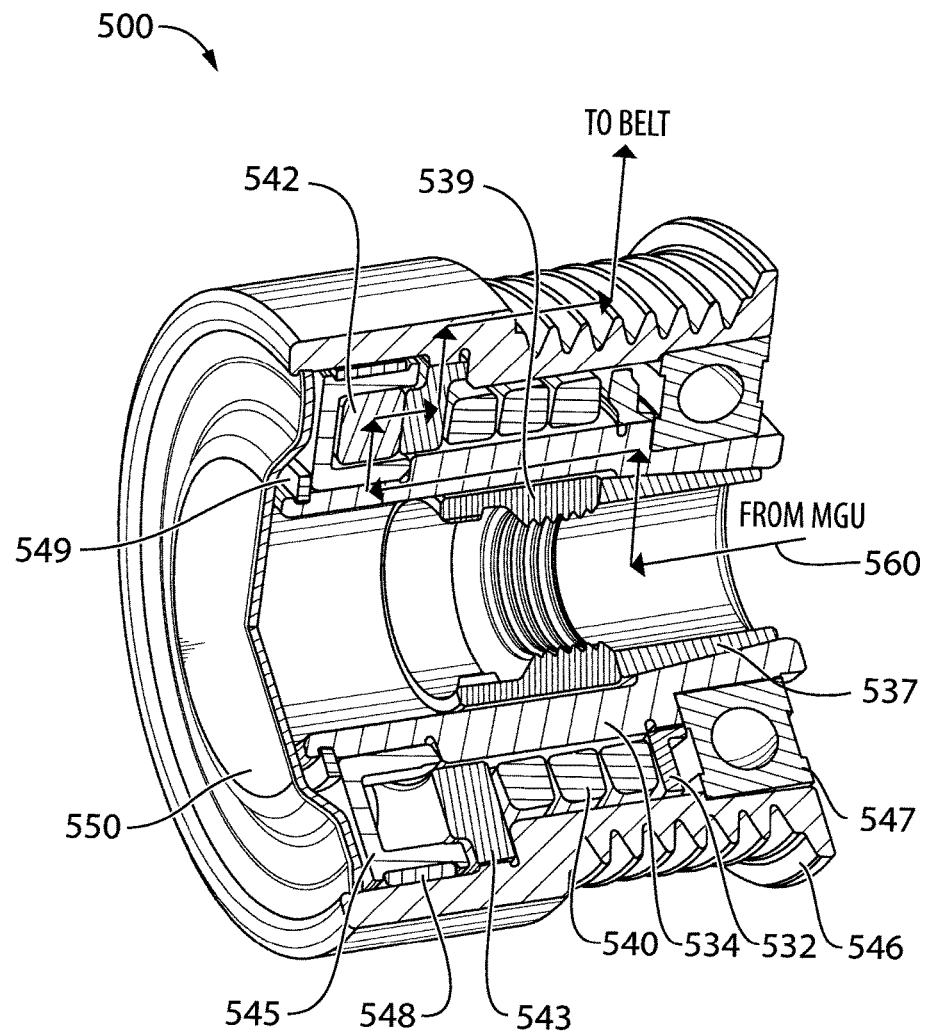
FIG. 20 is a perspective cutaway view of the isolator shown in FIG. 17, illustrating a torque path through the isolator from an MGU shaft to a belt.
Figure 21:
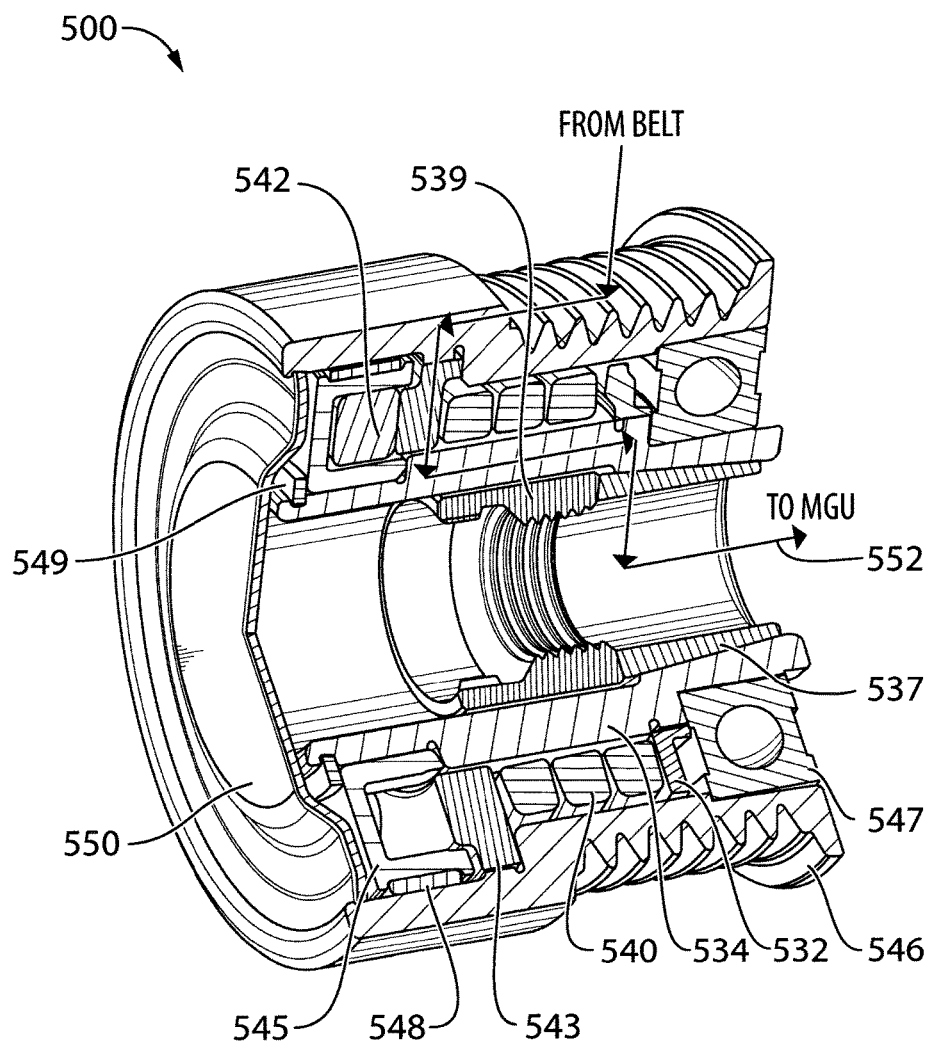
FIG. 21 is a perspective cutaway view of the isolator shown in FIG. 17, illustrating a torque path through the isolator from a belt to an MGU shaft.

Referring to the exploded views in FIGS. 18 and 19, the isolator 500 includes a first driver 532 that mounts to an alternator shaft 16a of FIG. 17 via a shaft extension 534, which may also be referred as a shaft mounting member 534 since it does not necessarily have to extend the shaft 16a. In particular the first driver 532 may include a radially inner surface with splines 533 thereon, which engage corresponding splines 535 on a radially outer surface of the shaft extension 534 thereby fixing the first driver 532 rotationally with the shaft extension 534. The isolator 500 further includes a split bushing 537 and a nut 539, a plurality of first isolation springs 542, support members (FIG. 3), shown at 544 for the first isolation springs 542, a second isolation spring 540, a second driver 545, a third driver 543, a plurality of anti-rattle springs 559, a pulley or other rotary drive member 546 with splines 555 thereon that engage splines 557 on the third driver 543 (thereby fixing the third driver 543 rotationally with the rotary drive member 546), a bearing 547, a bushing 548, a clip 549 for holding the bearing 547 in place on the shaft extension 534 (as shown in FIGS. 20 and 21), and a seal cover 550.

The second driver 545 is configured for holding the first isolation springs 542 and the support members 544 and for driving the first isolation springs 542, and has splines 551 thereon that engage splines 553 on the shaft extension 534, thereby fixing the second driver 545 rotationally with the shaft extension 534. The shaft extension 534, the first driver 532 and the second driver 545 may together be referred to as a shaft connector, since they rotate together as one element, and as one element with the shaft 16a.

The nut 539 mounts to the end of the alternator shaft 16a via a threaded connection. The nut 539 bears down on the split bushing 537 which wedges on a conical wall in the interior of the shaft extension 534 thereby locking the shaft extension 534 to the alternator shaft 16a.

The bearing 547 is engaged between the pulley 546 and the shaft extension 534 and permits relative rotation or angular movement therebetween. The bushing 548 permits relative rotation or angular movement between the pulley 546 and the second driver 545.

When the isolator 500 operates in a 'normal' or 'power-from-engine' mode whereby the alternator shaft 16a is driven by the belt 14, the torque path through the isolator 500 is as shown by the arrows 552 shown in FIG. 21. As shown, the pulley 546 is driven by the belt 14 (FIG. 17), and in turn drives the second isolation spring 540 through the third driver 543. In particular, the third driver member 543 has a first end drive surface 570 (FIG. 18) that is abuttable with a first end 572 of the second isolation spring 540. The second isolation spring 540 in turn drives the first driver 532. More particularly, the second end of the second isolation spring 540, which is shown at 574, is abuttable with a second end drive surface 576 on the first driver 532. The first driver 532 in turn drives the alternator shaft 16a (FIG. 17) through the shaft extension 534.

When the third driver 543 drives the second isolation spring 540, there is some angular movement of the third driver 543 relative to the shaft extension 534. Because the second driver 545 rotates with the shaft extension 534, the movement of the third driver member 543 causes it to rotate relative to the second driver 545, and to optionally to cause lugs shown at 561 to engage and compress by some amount the two anti-rattle springs 559 so as to reduce any rattling that might otherwise occur. The anti-rattle springs 559 may be similar in configuration to the springs 42 shown in FIG. 7.

The response of the second isolation spring 540 may be generally linear for an initial portion of its flexure or displacement. In embodiments wherein the second isolation spring 540 is a torsion spring that expands when transferring torque from the belt 14 after the initial displacement is done the coils of the spring 540 may engage the inner wall of the pulley 546, thereby limiting further expansion of the coils. As a result, the spring force of the spring 540 increases non-linearly (in a greater-than-linear manner).

It will be noted that when the isolator 500 is at rest, both the second isolation spring 540 and the first isolation springs 542 will be in a state of displacement away from their respective neutral positions. In the embodiment shown, this would mean that there will be some compression in both the first and second isolation springs 542 and 540.

When the isolator 500 operates in a BAS, 'boost' or 'power-from-supplemental-motor' mode whereby the alternator shaft 16a drives the belt 14 and the belt 14 drives the crankshaft 12, the torque path through the isolator 500 is as shown by the arrows 560 shown in FIG. 20. As shown, the crankshaft extension 534 is driven by the alternator shaft 16a (FIG. 17), and in turn drives the first isolation springs 542 through the second driver 545 and through the support members 544. The first isolation springs 542 in turn drive the third driver 543, which in turn drives the pulley 546. Because the first end drive surface 570 is not fixedly connected with the first end 572 of the second isolation spring 540, the third driver 543 can be driven by the first isolation springs 542 and the drive surface 570 may simply be rotated away from the first end 572 of the second isolation spring 540. When torque is transferred again from the pulley 546 to the shaft 16a, the anti-rattle springs 559 assist in reducing impact noise as the surface 570 returns into contact with the first end 572 of the second isolation spring 540.

Figure 7:
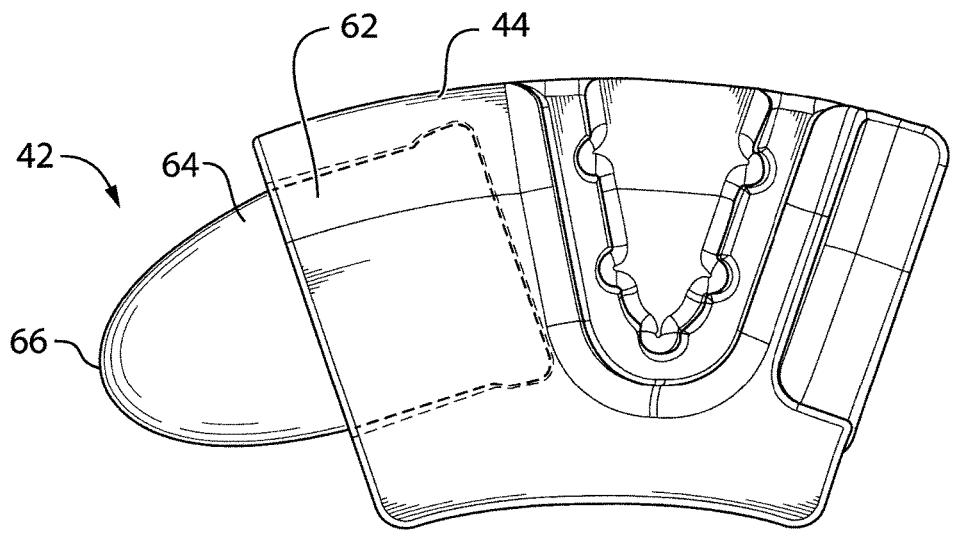
FIG. 7 is a side view of an isolator spring and a support member from the isolator shown in FIG. 1 for use in transferring torque from the belt to the engine crankshaft.
Figure 7A:
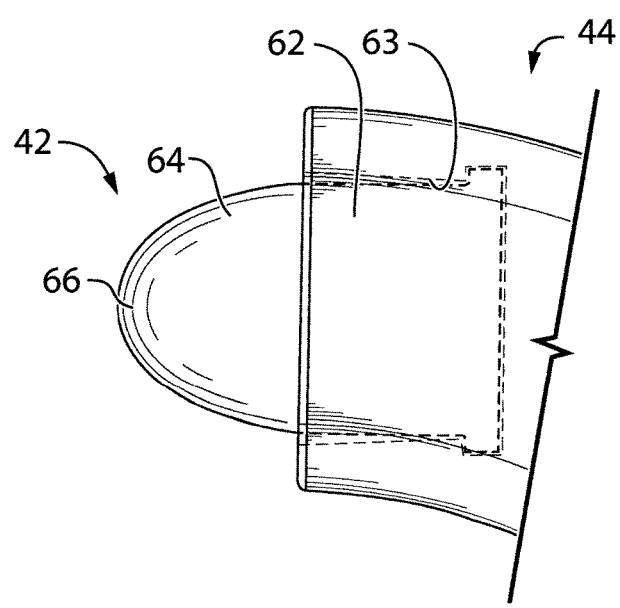
FIG. 7a is a side view a portion of the isolator spring and support member shown in FIG. 7.

The first isolation springs 542 may have any suitable configuration and may be, for example, similar to the isolator springs 42 shown in FIG. 7 to similar effect.

By providing a spring force that increases non-linearly, the isolator 500 can inhibit situations where the alternator shaft 16a causes the isolation springs 542 to fully compress, or bottom out permitting effectively a direct engagement between the second driver 545, the support members 544 and the third driver 543, which can lead to high stresses on many components including components of the isolator 500 and the alternator shaft 16a itself, and which can lead to noise and vibration being emitted from the isolator.

While two first isolation springs 542 are shown, there could alternatively be as few as one isolation spring 542, or any other number of isolation springs 542. In cases where a plurality of isolation springs 542 are provided, they may have polar symmetry about the axis of rotation of the pulley 546 (i.e. they may be spaced equally about the axis of rotation of the pulley 546).

Events that can cause separation of the driver 532 from the isolation springs 542 may occur in several ways. During operation of the isolator 500, particularly during operation in the 'normal' mode, it is possible that the driver 532 will receive a sudden torque increase from the crankshaft 12 from torsional vibrations at the crankshaft as described above. Additionally an event can occur where there is a sudden increase in resistance to movement from the belt 14, such as when a load at an accessory increases, such as when the alternator is used to generate electricity. Depending on the severity of such events the driver 532 may be driven by the crankshaft 12 away from the first isolation springs 542. As the torque at the crankshaft 12 is reduced or as the load at the accessories is reduced, the driver 532 returns to engage the isolation springs 542 and thus there is some amount of impact between the driver 532 and the isolation springs 542. It is advantageous to configure the second isolation springs to provide a relatively low resistance to compression during their impacts from the driver 532. In some embodiments, such as embodiments where coil compression springs or closed-cell foam springs are used for the isolation springs 542, the isolation springs 542 may have sufficient amounts of compression available to them that they can be sufficient long so that they are always in contact with the driver 532 even during high torque or high resistance events described above.

In the embodiments shown in the figures, the rotary drive members 46 and 346 are shown to be pulleys, however, as noted above the rotary drive member could be another type of rotary drive member, such as, for example, a gear for use in an engine assembly where the crankshaft drives accessories via a system of gears.

The above-described embodiments are intended to be examples only, and alterations and modifications may be carried out to those embodiments by those of skill in the art.

The invention claimed is:

1. An isolator, comprising:
   a driver that is connectable with a shaft of a motive device;
   a first rotary drive member that is operatively engageable with at least one second rotary drive member;
   at least one first isolation spring that is positioned to transfer a torque from the driver to the first rotary drive member and not from the first rotary drive member to the driver during rotation of the driver in the first direction; and
   at least one second isolation spring that is positioned to transfer a torque from the first rotary drive member to the driver and not from the driver to the first rotary drive member during rotation of the first rotary drive member in a first direction,
   wherein the at least one second isolation spring has a spring rate that is different than that of the first isolation spring,
   wherein the at least one second isolation spring is configured to have a force-displacement relationship such that displacement of the second isolation spring generates a linear increase in biasing force initially, and, over a selected range of movement away from a neutral position, generates a greater-than-linear increase in biasing force.

2. An isolator as claimed in claim 1, wherein the at least one first isolation spring is a plurality of first isolation springs that exhibit polar symmetry about an axis of rotation of the first rotary drive member and the driver.

3. An isolator as claimed in claim 1, wherein the at least one second isolation spring is a plurality of second isolation springs that exhibit polar symmetry about an axis of rotation of the first rotary drive member and the driver.

4. An isolator as claimed in claim 1, wherein the at least one first isolation spring is made from metal and the driver is made from metal, and wherein the isolator further comprises a bushing between the first rotary drive member and the driver to permit relative rotation therebetween, wherein the bushing has integrally thereon at least one first noise reduction member positioned between the driver and the at least one first isolation spring to prevent metal-to-metal contact therebetween.

5. An isolator as claimed in claim 1, wherein the at least one of the at least one first and second isolation springs is made from a closed-cell foam material.

6. An isolator as claimed in claim 1, wherein the at least one second isolation spring is displaced from the neutral position throughout a selected angular range of displacement between the first rotary drive member and the driver.

7. An isolator as claimed in claim 1, wherein the at least one first and second isolation springs remain in compression when no torque is transferred from the driver to the first rotary drive member.

8. An isolator as claimed in claim 1, wherein the at least one second isolation spring includes a torsion spring.

9. An isolator, comprising:
   a driver that is connectable with a shaft of a motive device;
   a first rotary drive member that is operatively engageable with at least one second rotary drive member; and
   at least one first isolation spring and at least one second isolation spring, wherein the at least one first and second isolation springs are positioned such that during rotation of the driver in a first direction torque is transferred from the driver to the first rotary drive member through the at least one first isolation spring and not through the at least one second isolation spring, and such that during rotation of the first rotary drive member in the first direction torque is transferred from the first rotary drive member to the driver through the at least one second isolation spring and not through the at least one first isolation spring,
   wherein the at least one second isolation spring has a spring rate that is different than that of the first isolation spring,
   wherein the at least one second isolation spring is configured to have a force-displacement relationship such that displacement of the second isolation spring generates a linear increase in biasing force initially, and, over a selected range of movement away from a neutral position, generates a greater-than-linear increase in biasing force.

* * * * *